US008568915B2

(12) United States Patent
Fuhr et al.

(10) Patent No.: US 8,568,915 B2
(45) Date of Patent: Oct. 29, 2013

(54) BATTERY WITH INTEGRALLY FORMED TERMINAL

(75) Inventors: Jason D. Fuhr, Sussex, WI (US); Steven J. Wood, Shorewood, WI (US); Dale B. Trester, Milwaukee, WI (US); Gary P. Houchin-Miller, Fox Point, WI (US); Thomas J. Dougherty, Waukesha, WI (US)

(73) Assignee: Johnson Controls—SAFT Power Solutions LLC, Wilmington, DE (US)

( * ) Notice: Subject to any disclaimer, the term of this patent is extended or adjusted under 35 U.S.C. 154(b) by 917 days.

(21) Appl. No.: 12/368,938

(22) Filed: Feb. 10, 2009

(65) Prior Publication Data

US 2009/0208836 A1 Aug. 20, 2009

Related U.S. Application Data

(63) Continuation-in-part of application No. PCT/US2007/017785, filed on Aug. 10, 2007.

(60) Provisional application No. 60/837,345, filed on Aug. 11, 2006, provisional application No. 61/101,985, filed on Oct. 1, 2008, provisional application No. 61/146,994, filed on Jan. 23, 2009.

(51) Int. Cl.
*H01M 6/42* (2006.01)
*H01M 2/30* (2006.01)
*H01M 6/00* (2006.01)
*H01M 2/04* (2006.01)

(52) U.S. Cl.
USPC .............................. 429/158; 429/164; 429/178

(58) Field of Classification Search
USPC .......................................... 429/158, 164, 178
See application file for complete search history.

(56) References Cited

U.S. PATENT DOCUMENTS

| 2,042,806 A | 6/1936 | Schulte |
| 2,416,079 A | 2/1947 | Anthony |
| 3,338,452 A | 8/1967 | Oakley et al. |
| 4,189,473 A | 2/1980 | Cole et al. |
| 4,554,221 A | 11/1985 | Schmid |
| 4,957,829 A | 9/1990 | Holl |

(Continued)

FOREIGN PATENT DOCUMENTS

| EP | 0 607 675 B1 | 9/1996 |
| EP | 1109237 A1 | 6/2001 |

(Continued)

OTHER PUBLICATIONS

European Search Report for European Application No. 09012377.9, dated Dec. 22, 2009, 10 pages.

(Continued)

*Primary Examiner* — Joseph Kosack
(74) *Attorney, Agent, or Firm* — Fletcher Yoder PC

(57) ABSTRACT

A battery comprising a housing having a central longitudinal axis. A cover is coupled to the housing and a first flange is integrally formed with the cover and configured to act as a first terminal for the battery. At least a portion of the first flange extends away from the housing in a direction generally perpendicular to the central longitudinal axis. Wherein the first flange is configured for electrical coupling with a terminal of an adjacent battery in a battery system. for electrical coupling with a terminal of an adjacent battery in a battery system.

21 Claims, 12 Drawing Sheets

(56) References Cited

U.S. PATENT DOCUMENTS

| | | |
|---|---|---|
| 5,336,570 A | 8/1994 | Dodge, Jr. |
| 5,606,238 A | 2/1997 | Spellman et al. |
| 5,866,276 A | 2/1999 | Ogami et al. |
| 5,879,833 A | 3/1999 | Yoshii et al. |
| 6,001,501 A | 12/1999 | Collie |
| 6,106,972 A | 8/2000 | Kokubo et al. |
| 6,265,091 B1 | 7/2001 | Pierson et al. |
| 6,379,831 B1 | 4/2002 | Draper et al. |
| 6,379,837 B1 | 4/2002 | Takahashi et al. |
| 6,410,184 B1 | 6/2002 | Horiuchi et al. |
| 6,410,185 B1 | 6/2002 | Takahashi et al. |
| 6,461,757 B1 | 10/2002 | Sasayama et al. |
| 6,465,123 B1 | 10/2002 | Baumann et al. |
| 6,472,098 B1 | 10/2002 | Sawada et al. |
| 6,541,154 B2 | 4/2003 | Oogami et al. |
| 6,558,835 B1 | 5/2003 | Kurisu et al. |
| 6,579,640 B1 | 6/2003 | Nagase et al. |
| 6,656,632 B2 | 12/2003 | Asaka et al. |
| 6,767,666 B2 | 7/2004 | Nemoto et al. |
| 6,858,345 B2 | 2/2005 | Amine et al. |
| 6,896,995 B2 | 5/2005 | Saito |
| 6,923,837 B2 | 8/2005 | Longhi et al. |
| 6,932,651 B2 | 8/2005 | Mita et al. |
| 6,953,638 B2 | 10/2005 | Inui et al. |
| 7,014,949 B2 | 3/2006 | Kanai et al. |
| 7,094,496 B2 | 8/2006 | Rodriguez et al. |
| 7,129,001 B2 | 10/2006 | Munenaga et al. |
| 7,147,963 B2 | 12/2006 | Kimoto et al. |
| 7,160,643 B2 | 1/2007 | Kunimoto et al. |
| 7,189,474 B2 | 3/2007 | Hamada et al. |
| 7,270,576 B2 | 9/2007 | Kim et al. |
| 7,351,493 B2 | 4/2008 | Uemoto et al. |
| 2001/0046624 A1 | 11/2001 | Goto et al. |
| 2003/0059676 A1 | 3/2003 | Ruiz Rodriguez et al. |
| 2004/0038123 A1 | 2/2004 | Hisamitsu et al. |
| 2004/0175612 A1 | 9/2004 | Conti |
| 2005/0048365 A1 | 3/2005 | Miyahisa et al. |
| 2005/0079408 A1 | 4/2005 | Hirano |
| 2005/0100783 A1 | 5/2005 | Ro et al. |
| 2005/0170239 A1 | 8/2005 | Uemoto et al. |
| 2005/0170240 A1 | 8/2005 | German et al. |
| 2005/0174092 A1* | 8/2005 | Dougherty et al. ........... 320/128 |
| 2005/0287427 A1 | 12/2005 | Kim et al. |
| 2006/0026822 A1 | 2/2006 | Seman, Jr. et al. |
| 2006/0040173 A1 | 2/2006 | Shimamura et al. |
| 2006/0063067 A1 | 3/2006 | Kim |
| 2006/0073378 A1 | 4/2006 | Hamery et al. |
| 2006/0073379 A1 | 4/2006 | Kim et al. |
| 2006/0078789 A1 | 4/2006 | Wegner |
| 2006/0127754 A1* | 6/2006 | Hamada et al. ............... 429/158 |
| 2006/0162149 A1 | 7/2006 | Ha et al. |
| 2006/0177734 A1 | 8/2006 | Yao |
| 2006/0204840 A1 | 9/2006 | Jeon et al. |
| 2006/0216582 A1 | 9/2006 | Lee et al. |
| 2006/0216583 A1 | 9/2006 | Lee et al. |
| 2006/0234119 A1 | 10/2006 | Kruger et al. |
| 2006/0246350 A1 | 11/2006 | Takayama et al. |
| 2007/0015050 A1 | 1/2007 | Jung et al. |
| 2007/0026303 A1 | 2/2007 | Jeon et al. |
| 2007/0026305 A1 | 2/2007 | Jeon et al. |
| 2007/0026306 A1 | 2/2007 | Lee et al. |
| 2007/0026739 A1 | 2/2007 | Kim et al. |
| 2007/0037051 A1 | 2/2007 | Kim et al. |
| 2008/0160395 A1 | 7/2008 | Okada et al. |
| 2009/0111015 A1 | 4/2009 | Wood et al. |
| 2010/0183904 A1 | 7/2010 | Muis |

FOREIGN PATENT DOCUMENTS

| | | | |
|---|---|---|---|
| EP | 1 213 784 A2 | | 6/2002 |
| EP | 1503442 A2 | | 2/2005 |
| EP | 1 250 720 B1 | | 5/2006 |
| EP | 1 786 051 A1 | | 5/2007 |
| FR | 2.058.740 | * | 5/1971 |
| FR | 2058740 A5 | | 5/1971 |
| FR | 2 585 185 | | 1/1987 |
| GB | 2 136 629 A | | 9/1984 |
| JP | 2003-308823 | | 10/2003 |
| JP | 2007-012487 | | 1/2007 |
| JP | 2007-280831 | | 10/2007 |
| WO | WO 2007/134198 A1 | | 11/2007 |
| WO | WO 2008/021230 | | 2/2008 |
| WO | WO 2008/027343 A1 | | 3/2008 |
| WO | WO2008/074034 A1 | | 6/2008 |
| WO | WO 2008/086417 | | 7/2008 |
| WO | WO2008/098193 A2 | | 8/2008 |
| WO | WO 2009/016476 A2 | | 2/2009 |
| WO | WO 2010/019764 A2 | | 2/2010 |
| WO | WO 2010/085636 | | 7/2010 |

OTHER PUBLICATIONS

Response to Office Action for European Application No. 07836697. 8, dated Jan. 6, 2010, 6 pages.
International Search Report and Written Opinion for International Application No. PCT/US2007/017785; mailing date Mar. 3, 2008; 13 pages.
Office Action for European Application No. 07836697.8, dated Feb. 17, 2010, 3 pages.
Communication under Rule 71(3) EPC for European Application No. 07783619.5, dated Jan. 31, 2011, 61 pages.
International Preliminary Report on Patentability for International Application No. PCT/IB2008/001984, dated Feb. 2, 2010, 6 pages.
International Search Report for International Application No. PCT/IB2008/001984, dated Feb. 4, 2009, 2 pages.
International Search Report for International Application No. PCT/US2007/068716, dated Oct. 17, 2007, 5 pages.
Office Action for Chinese Application No. 200780025271.0 with English translation, dated Sep. 8, 2010, 4 pages.
Office Action for European Application No. 07783619.5, dated Jul. 29, 2009, 4 pages.
Office Action of Chinese Patent Application No. 200780029735.5 with English translation, dated Jun. 25, 2010, 10 pages.
Response to Office Action for European Application No. 07783619. 5, dated Feb. 5, 2010, 9 pages.
Response to Office Action for European Application No. 09012377. 9, dated Feb. 10, 2011, 5 pages.
Written Opinion of International Application No. PCT/US2007/068716, dated Oct. 17, 2007, 6 pages.
International Preliminary Report on Patentability, Written Opinion of the International Searching Authority and International Search Report for International Application No. PCT/US2007/017785; date of mailing Mar. 3, 2008; 15 pagees.
International Search Report and Written Opinion for International Application No. PCT/US2009/053697, dated Mar. 23, 2010, 6 pages.
Office Action for European Application No. 07836697.8, mail date Mar. 7, 2011, 11 pages.
Office Action for European Application No. 09012377.9, dated Jun. 1, 2010, 1 page.
Response to European Office Action for European Application No. 07836697.8, dated Jun. 25, 2010, 9 pages.
Response to Office Action for European Patent Application No. 07836697.8 including claim sets; Jul. 8, 2011; 11 pages.
International Search Report for International Application No. PCT/US2010/021791; dated Aug. 13, 2010; 3 pages.
Office Action of Chinese Patent Application No. 200780029735.5 with English translation, dated Jul. 25, 2010, 10 pages.
Notice of deficiencies of International Application No. 07 836 697. 8-2119, dated Aug. 31, 2009, (2 pages).
Response to Office Action for European Application No. 09012377. 9, dated Sep. 28, 2010, 14 pages.
Office Action for European Application No. 09012377.9, dated Oct. 7, 2010, 3 pages.
Office Action for U.S. Appl. No. 13/186,314, dated Jan. 19, 2012, 15 pages.
Office Action for U.S. Appl. No. 12/263,123, dated Jun. 6, 2012, 10 pages.

* cited by examiner

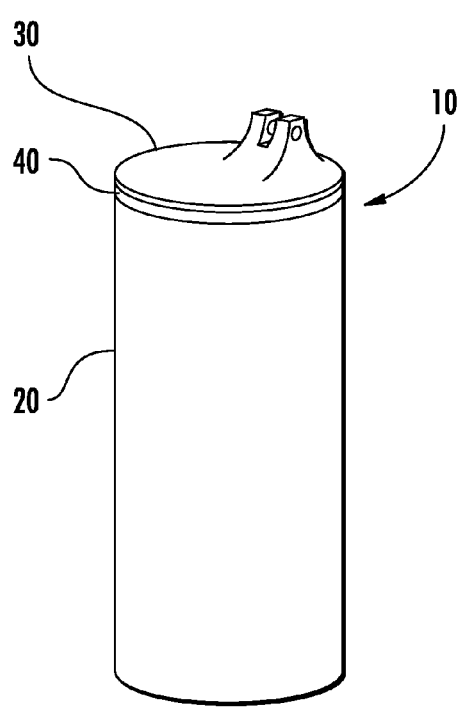
FIG. 3
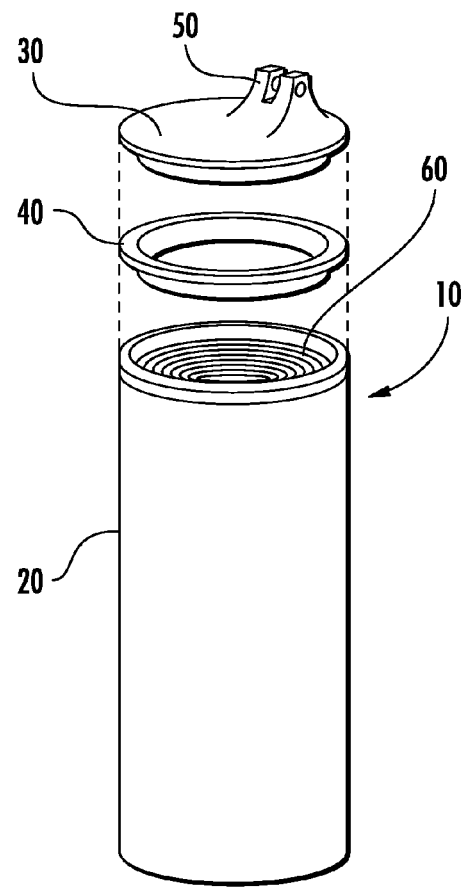
FIG. 4
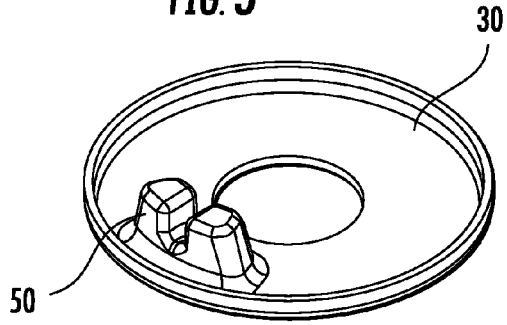
FIG. 5
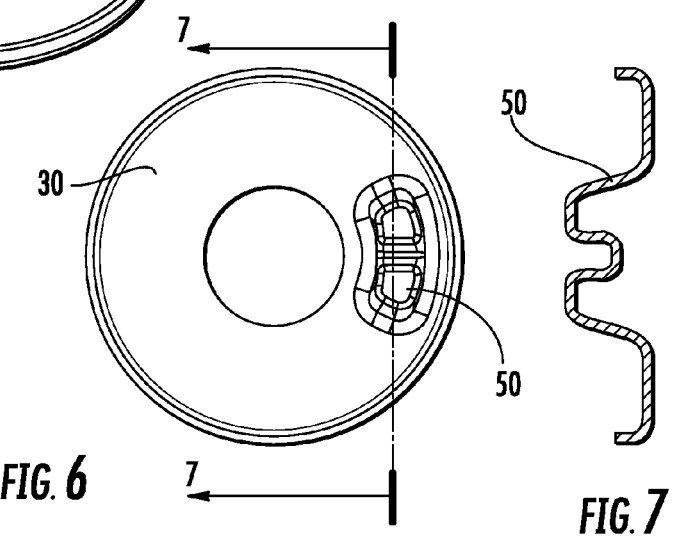
FIG. 6
FIG. 7

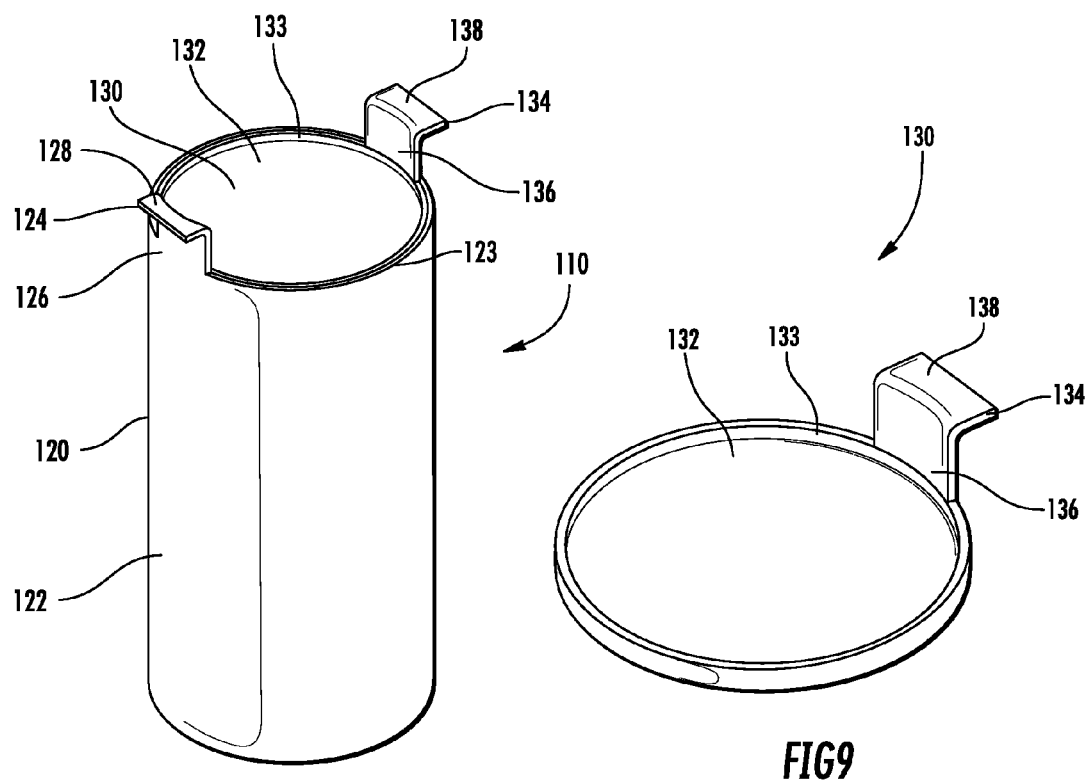
FIG. 8
FIG. 9
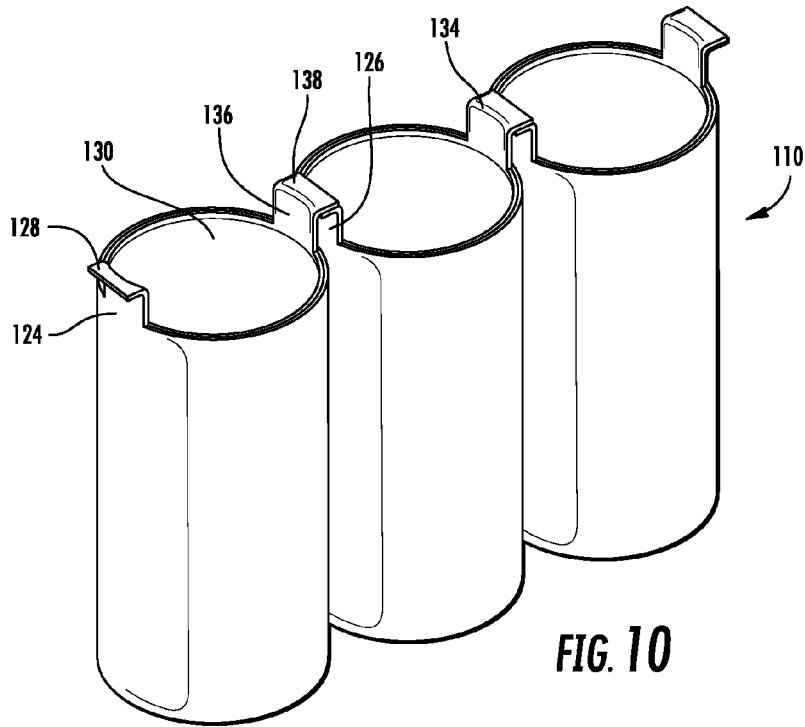
FIG. 10

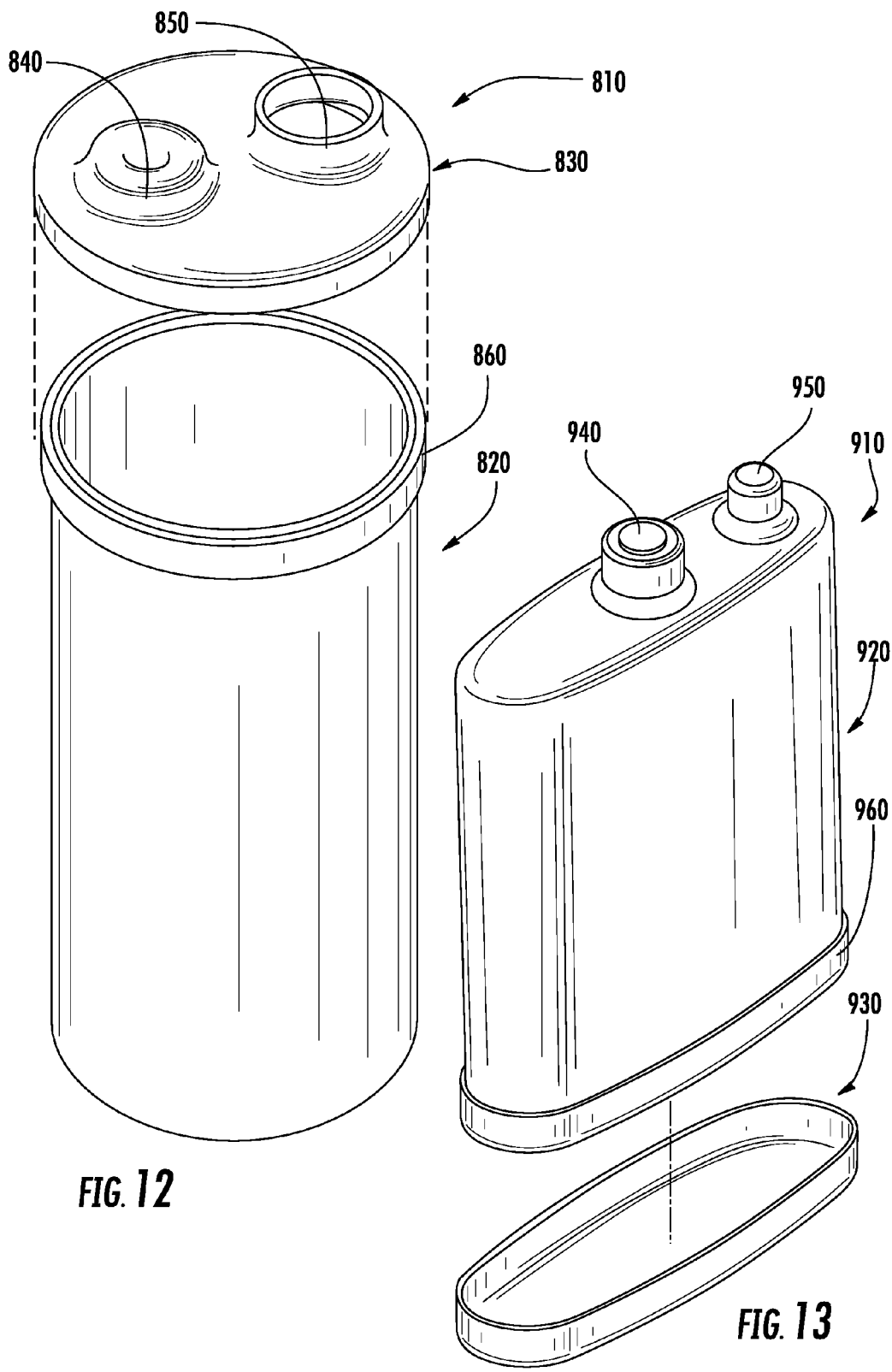

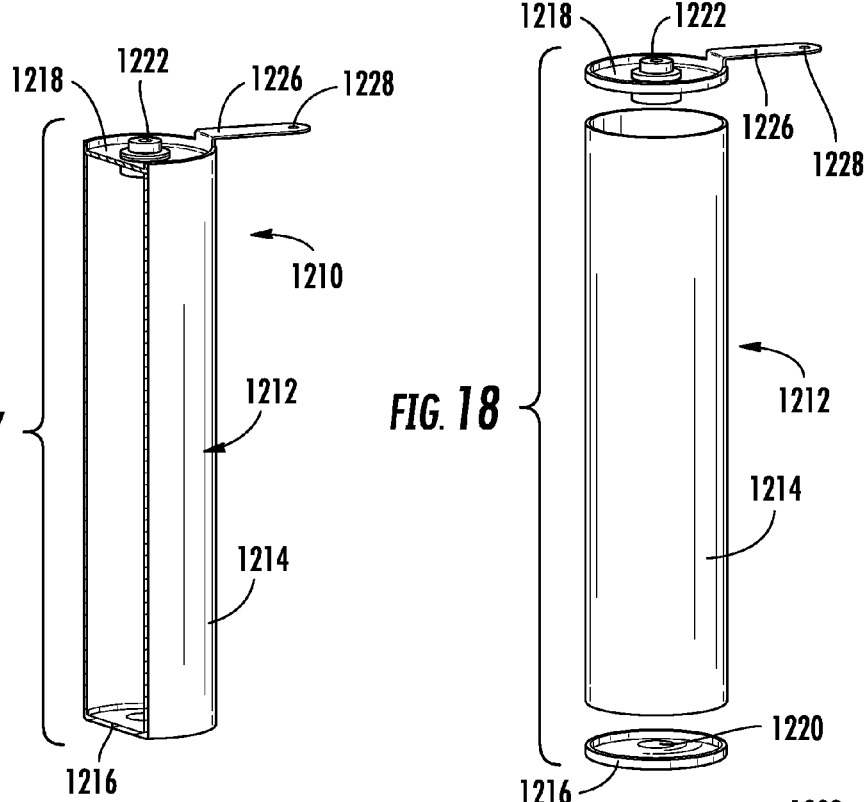
FIG. 17
FIG. 18
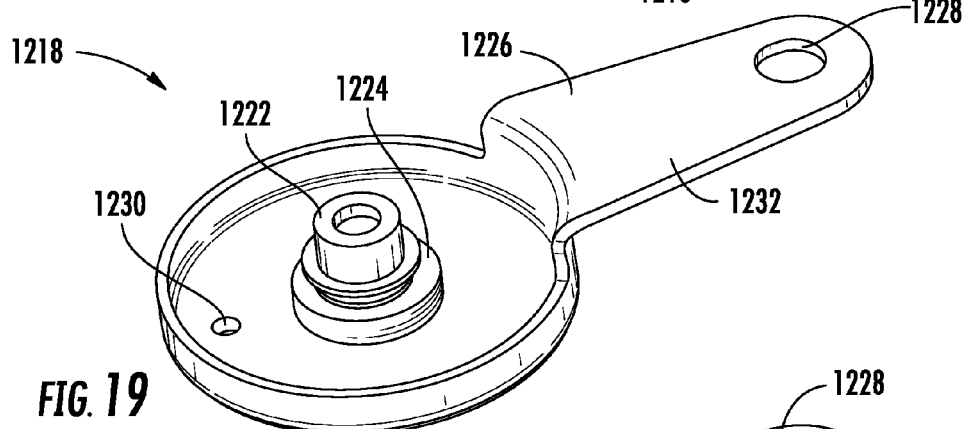
FIG. 19
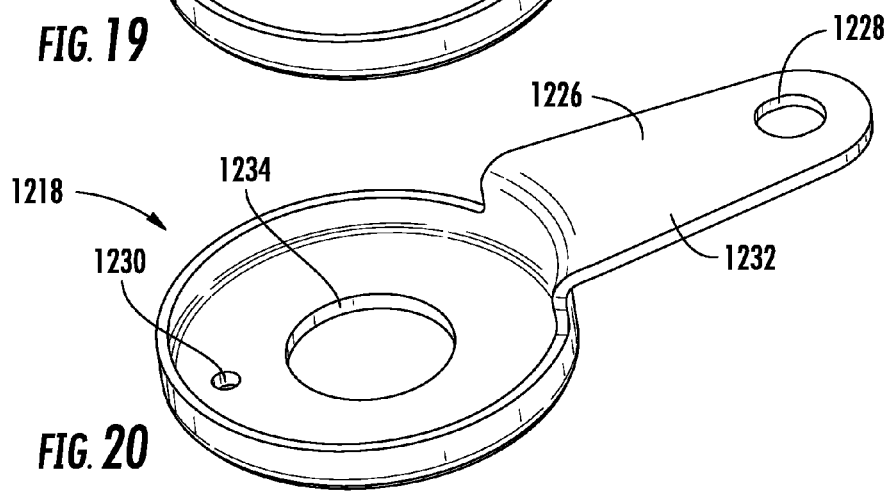
FIG. 20

BATTERY WITH INTEGRALLY FORMED TERMINAL

CROSS-REFERENCE TO RELATED PATENT APPLICATIONS

This application is a Continuation-In-Part of International Application No. PCT/US2007/017785 filed Aug. 10, 2007, which claims the benefit of and priority to U.S. Provisional Patent Application No. 60/837,345, filed Aug. 11, 2006. This Application also claims the benefit of and priority to U.S. Provisional Patent Application No. 61/101,985, filed Oct. 1, 2008, and U.S. Provisional Patent Application No. 61/146,994, filed Jan. 23, 2009.

The disclosures of the following patent applications are incorporated by reference in their entirety: International Application No. PCT/US2007/017785, filed Aug. 10, 2007; U.S. Provisional Patent Application No. 60/837,345, filed Aug. 11, 2006; U.S. Provisional Patent Application No. 61/101,985, filed Oct. 1, 2008; and U.S. Provisional Patent Application No. 61/146,994, filed Jan. 23, 2009.

BACKGROUND

The present disclosure relates to the field of batteries and battery systems. More specifically, the present disclosure relates to integrally formed terminals for batteries or cells (e.g., lithium-ion batteries).

It is known to provide batteries or cells for use in vehicles such as automobiles. For example, lead-acid batteries have been used in starting, lighting, and ignition applications. More recently, hybrid electric vehicles are being developed which utilize a battery (e.g., a lithium-ion or nickel-metal-hydride battery) in combination with other systems (e.g., an internal combustion engine) to provide power for the vehicle.

It is known that a battery generally includes two terminals (e.g., a positive terminal and a negative terminal, etc.) through which the battery is electrically connected to other batteries or other components. A battery may have terminals that protrude from the battery surface and/or have a casing that acts as a terminal. These terminals are provided as separate elements that are coupled to the battery (e.g., by welding to a battery cover). This adds an additional step to the manufacturing process, as well as increased cost. The integrity of this weld or other coupling mechanism may present issues over the life of the battery.

Battery systems or assemblies include a number of batteries or cells electrically coupled to each other and/or to other elements of the system. Such cells are conventionally coupled together using conductive members (e.g., bus bars). Such conductive members may be welded to the terminals of the batteries or secured using fasteners. It would be advantageous to eliminate the need for such conductive members to remove the additional cost and manufacturing time associated with such components (e.g., to reduce the number of parts in the battery system and to eliminate the need to handle and assemble the components during manufacturing).

Accordingly, it would be advantageous to provide a battery that includes one or more terminals that are integrally formed with the body or cover of the battery. It would also be advantageous to configure the terminals so they can be directly coupled to terminals of adjacent batteries.

SUMMARY

One exemplary embodiment relates to a battery including a housing having a central longitudinal axis. The battery also includes a cover coupled to the housing and a first flange integrally formed with the cover. The first flange is configured to act as a first terminal for the battery. At least a portion of the first flange extends away from the housing in a direction generally perpendicular to the central longitudinal axis. The first flange is configured for electrical coupling with a terminal of an adjacent battery in a battery system.

Another exemplary embodiment relates to a battery module including a plurality of electrochemical cells. Each of the cells comprise a housing having a longitudinal axis and a lid coupled to the housing. The lid comprises a member configured to act as a first terminal for the cell. At least a portion of the member extends away from the housing in a direction generally perpendicular to the longitudinal axis. The member is conductively coupled to a terminal of an adjacent cell.

Another exemplary embodiment relates to a method of producing a battery module including providing a plurality of electrochemical cells. Each of the cells comprises a housing having a longitudinal axis and a cover coupled to the housing at a first end of the cell. The cover comprises a member configured to act as a first terminal for the cell. At least a portion of the member extends away from the housing in a direction generally perpendicular to the longitudinal axis. The method also includes coupling the member of one of the plurality of cells to a terminal of an adjacent cell.

BRIEF DESCRIPTION OF THE FIGURES

FIG. 3 is a perspective view of a battery or cell according to an exemplary embodiment.

FIG. 4 is an exploded view of the battery of FIG. 3 according to an exemplary embodiment.

FIG. 5 is a perspective view of a cover for a battery according to an exemplary embodiment.

FIG. 6 is a top view of the cover of FIG. 5 according to an exemplary embodiment.

FIG. 7 is a cross-section view of the cover of FIG. 6 taken along line 7-7 according to an exemplary embodiment.

FIG. 8 is a perspective view of a battery according to an exemplary embodiment.

FIG. 9 is a perspective view of the cover of the battery of FIG. 8 according to an exemplary embodiment.

FIG. 10 is a view of multiple batteries connected together according to an exemplary embodiment.

FIG. 12 is an exploded view of a battery according to an exemplary embodiment.

FIG. 13 is an exploded view of a battery according to an exemplary embodiment.

FIG. 17 is a cutaway perspective view of a portion of an electrochemical cell shown without electrodes according to an exemplary embodiment.

FIG. 18 is an exploded view of the electrochemical cell as shown in FIG. 17.

FIG. 19 is a perspective view of a lid having an integral bus bar coupled to a terminal according to an exemplary embodiment.

FIG. 20 is a perspective view of the lid as shown in FIG. 19.

DETAILED DESCRIPTION

Figure 1:
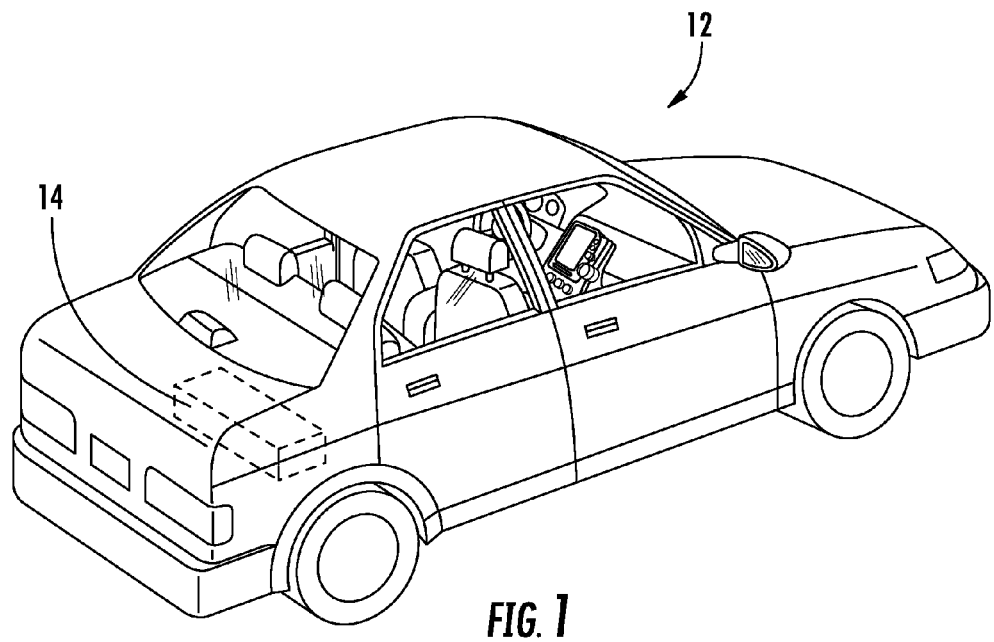
FIG. 1 is a perspective view of a vehicle having a battery system according to an exemplary embodiment.

Referring to FIG. 1, a vehicle 12 is shown according to an exemplary embodiment and includes a battery system 14. The size, shape, configuration, and location of battery system 14 and the type of vehicle 12 may vary according to various exemplary embodiments. For example, while vehicle 12 in FIG. 1 is shown as an automobile, according to various exemplary embodiments, vehicle 12 may comprise a wide variety of differing types of vehicles including, among others, motorcycles, buses, recreational vehicles, boats, and the like. According to an exemplary embodiment, vehicle 12 has a battery system 14 for providing all or a portion of the motive power for the vehicle 12. Such a vehicle can be an electric vehicle (EV), a hybrid electric vehicle (HEV), a plug-in hybrid electric vehicle (PHEV), or other type of vehicle using electric power for propulsion (collectively referred to as "electric vehicles").

Although the battery system 14 is illustrated in FIG. 1 as being positioned in the trunk or rear of the vehicle 12, according to other exemplary embodiments, the location of the battery system 14 may differ. For example, the position of the battery system 14 may be selected based on the available space within the vehicle 12, the desired weight balance of the vehicle 12, the location of other components used with the battery system 14 (e.g., battery management systems, vents or cooling devices, etc.), and a variety of other considerations.

Figure 1A:
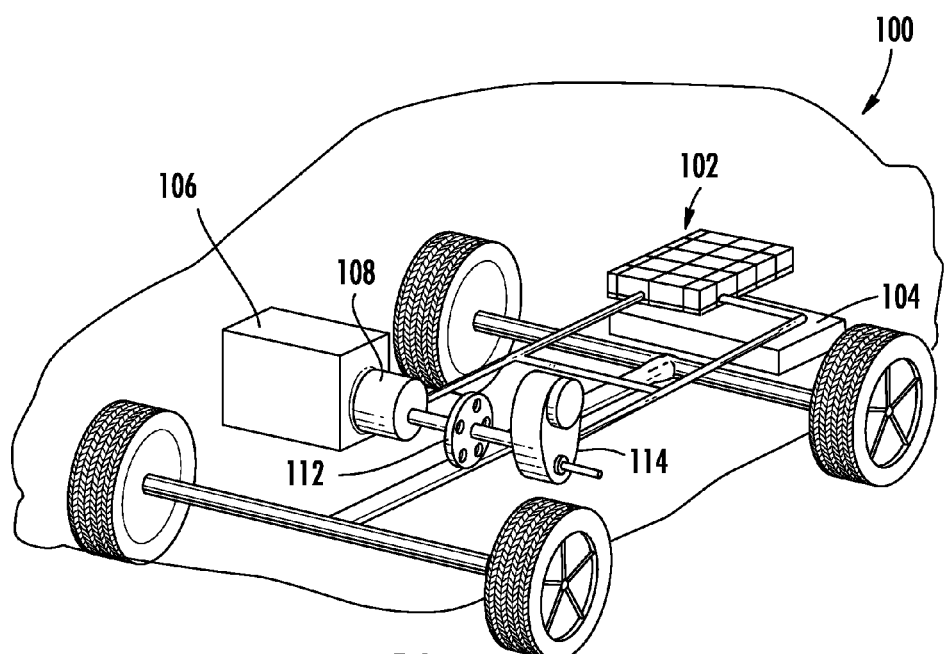
FIG. 1A is a schematic cutaway view of a hybrid electric vehicle according to an exemplary embodiment.

FIG. 1A illustrates a cutaway schematic view of a vehicle 100 provided in the form of a PHEV according to an exemplary embodiment. A battery system 102 is provided toward the rear of the vehicle 100 proximate to a fuel tank 104 (battery system 102 may be provided immediately adjacent to the fuel tank 104 or may be provided in a separate compartment in the rear of the vehicle 100 (e.g., a trunk) or may be provided elsewhere in the vehicle 100). An internal combustion engine 106 is provided for times when the vehicle 100 utilizes gasoline power to propel itself. An electric motor 108, a power split device 112, and a generator 114 are also provided as part of the vehicle drive system of vehicle 100. The vehicle 100 may be powered or driven by just the battery system 102, by just the engine 106, or by both the battery system 102 and the engine 106.

It should be noted that other types of vehicles and configurations for the vehicle electrical system may be used according to other exemplary embodiments, and that the schematic illustration of FIG. 1A should not be considered to limit the scope of the subject matter described in the present application.

Figure 2:
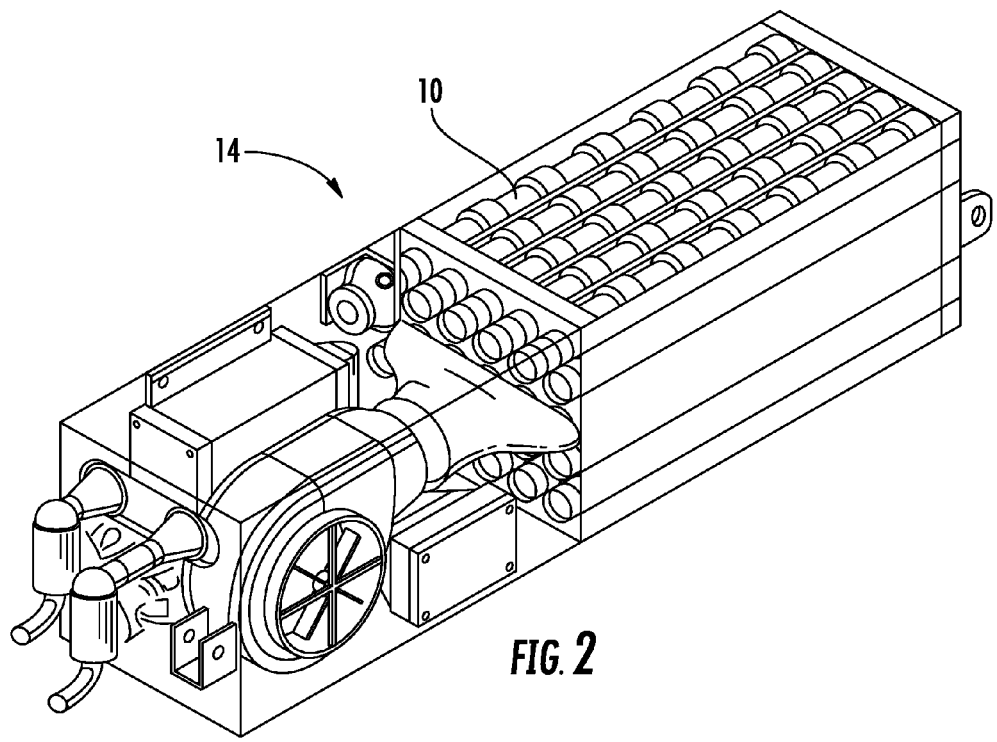
FIG. 2 is a perspective view of a battery system according to an exemplary embodiment.

Referring to FIG. 2, battery system 14 is shown according to an exemplary embodiment. Battery system 14 includes a plurality of electrochemical cells or batteries, shown as batteries 10 (e.g., lithium-ion batteries, NiMH batteries, lithium polymer batteries, etc.). Batteries 10 may be positioned within a housing that may include such features as a battery management system, a cooling fan, plenum assembly, etc. Other configurations of battery system 14 may be used in accordance with various other exemplary embodiments.

Figure 2A:
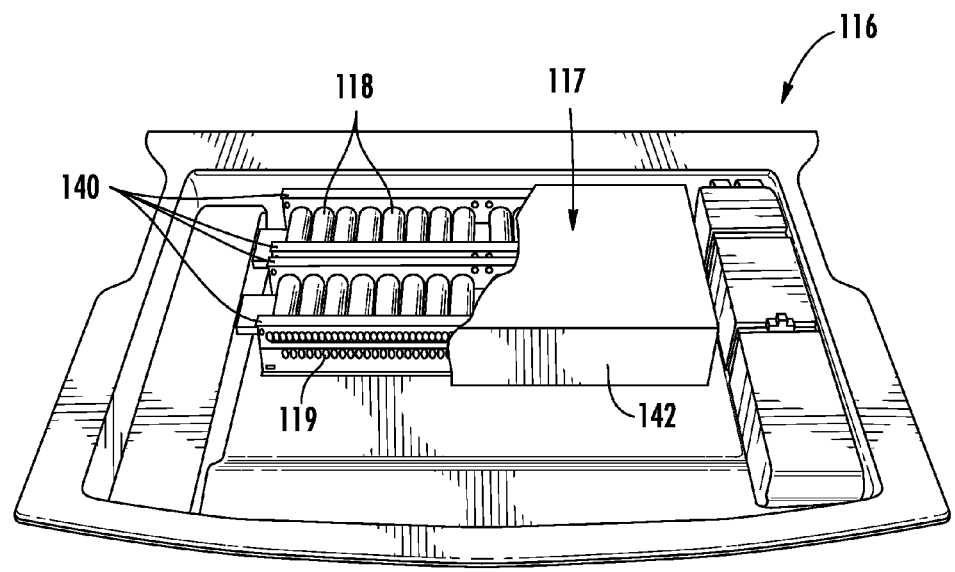
FIG. 2A is a cutaway perspective view of a battery system according to an exemplary embodiment.

Referring to FIG. 2A, a battery system 116 is shown according to an exemplary embodiment and is responsible for packaging or containing a battery module 117 containing electrochemical cells or batteries 118, connecting the electrochemical cells 118 to each other and/or to other components of the vehicle electrical system, and regulating the electrochemical cells 118 and other features of the battery system 116. For example, the battery system 116 may include features that are responsible for monitoring and controlling the electrical performance of the battery system 116, managing the thermal behavior of the battery system 116, containment and/or routing of effluent (e.g., gases that may be vented from a cell 118), and other aspects of the battery system 116.

Referring to FIG. 2A, the battery module 117 includes a plurality of electrochemical cells or batteries 118 (e.g., lithium-ion batteries, nickel-metal-hydride cells, lithium polymer cells, etc., or other types of electrochemical cells now known or hereafter developed). According to an exemplary embodiment, the electrochemical cells 118 are generally cylindrical lithium-ion cells configured to store an electrical charge. According to other exemplary embodiments, cells 118 could have other physical configurations (e.g., oval, prismatic, polygonal, etc.). The capacity, size, design, and other features of the cells 118 may also differ from those shown according to other exemplary embodiments. According to an exemplary embodiment, the cells 118 each have at least one terminal 119 located at an end thereof. According to another exemplary embodiment, the cells each have two terminals 119 (e.g., a first or positive terminal, and a second or negative terminal) located at an end thereof.

According to various exemplary embodiments, the size, shape, and location of the battery module 117 or battery system 116, the type of vehicle 100, the type of vehicle technology (e.g., EV, HEV, PHEV, etc.), and the battery chemistry, among other features, may differ from those shown or described.

Although illustrated in FIG. 2A as having a particular number of electrochemical cells 118, it should be noted that according to other exemplary embodiments, a different number and/or arrangement of electrochemical cells 118 may be used depending on any of a variety of considerations (e.g., the desired power for the battery system 116, the available space within which the battery system 116 must fit, etc.).

According to an exemplary embodiment, a series of members or elements in the form of trays 140 or similar structures are provided to contain the various cells 118 in relation to each other. The trays 140 may be made of a polymeric material or other suitable materials (e.g., electrically insulative materials). The trays 140 may also include features to provide spacing of the cells 118 away from the surface of the trays 140 and/or from adjacent cells 118. A housing or cover 142 and a base plate (not shown) may be provided to partially or completely surround or enclose the cells 118 and trays 140.

While FIG. 2A shows an exemplary embodiment of a battery module 117, it should be understood that the battery module 117 is not limited to any particular arrangement as will be appreciated by those reviewing this disclosure. For instance, while the battery module 117 shown in FIG. 2A is shown with horizontally oriented cells 118 arranged back-to-back in two banks or groups by parallel frame members (i.e., trays 140), it should be understood that the battery module 117 may have many different configurations. For example, the cells 118 may also be generally vertical, be several separate groups, or arranged in other configurations. Furthermore, different numbers and types (e.g., nickel-metal-hydride, etc.) of cells 118 may be used. The cover 142 may include features (e.g., sidewalls, etc.) that are intended to receive and arrange the cells 118.

Referring now to FIGS. 3-4, a battery or cell 10 is shown according to an exemplary embodiment. Battery 10 is generally cylindrical and comprises a container 20 (e.g., housing, casing, can, etc.), a cover or lid 30 coupled to container 20, a member or element in the form of an insulator 40 that separates container 20 and cover 30, and one or more terminals 50. Container 20 is a generally hollow body (e.g., can, cup, canister, etc.) made of aluminum or another conductive material. Container 20 has provided therein electrodes 60 and an electrolyte (not shown) and may act as a terminal 50 for battery 10. According to an exemplary embodiment, battery 10 is a lithium-ion battery, although those reviewing this disclosure will recognize that other types of batteries may also use features described herein (e.g., nickel-metal-hydride batteries, lithium-polymer batteries, etc.).

Cover 30 is a generally planar member or element (e.g., lid, cap, top, etc) that encloses electrodes 60 and the electrolyte in container 20 and is conductively separated from container 20 by insulator 40. According to an exemplary embodiment, cover 30 is aluminum or another suitable conductive material and is conductively coupled to electrode 60 in battery 10.

Referring to FIGS. 5-7, according to an exemplary embodiment, terminal 50 is a protrusion or extension that is extruded, drawn, molded, cast, or otherwise formed as an integral part of cover 30. According to other exemplary embodiments, terminal 50 may be a variety of shapes other than that shown in FIGS. 5-7 (e.g. cylindrical, rectangular, trapezoidal, etc.) and may be provided in a variety of positions (e.g., central, near the edge, etc.) and orientations. According to still other exemplary embodiments, terminal 50 may be provided on container 20 or terminals 50 may be provided both on container 20 and on cover 30. Terminal 50 may be further machined or shaped to provide a feature for coupling terminal 50 to wires, sockets, bus bars, or other components. It should be noted that terminal 50 can either follow the contour of the cover 30 or can be flattened so that a standard spade connector can be placed flat on the surface of the terminal 50 according to other exemplary embodiments.

Referring now to FIG. 8, a battery 110 is shown according to an exemplary embodiment. Battery 110 is generally cylindrical and comprises a container or housing 120 and a cover or lid 130 coupled to container 120. Container 120 is a generally thin-walled hollow body (e.g., a can, cup, canister, etc.) made of aluminum or another conductive material and is conductively coupled to an electrode (e.g., cathode or anode). Container 120 holds electrodes and an electrolyte (not shown) and may act as a terminal for battery 110. Container 120 includes a side wall 122 with a rim 123. Container 120 also includes a feature shown as a flange 124 (e.g., a tab, flap, projection, extension, protrusion, projection, lip, overhang, protuberance, etc.).

Flange 124 is a generally flat member (e.g., a tab, flap, projection, extension, protrusion, projection, lip, overhang, protuberance, etc.) that is integrally formed with side wall 122 and extends upward past rim 123. Flange 124 may be bent and have a vertical portion 126 and a horizontal portion 128 that extends beyond side wall 122 (e.g., in a direction generally perpendicular to the axial or longitudinal direction for the cell). Flange 124 is configured to engage flange 134 on cover 130 of an adjacent battery 110 (described in more detail below with respect to FIG. 10).

Cover 130, as shown in FIG. 9, is a generally flat body (e.g., lid, cap, top, etc.) that encloses electrodes and electrolyte in container 120 and is conductively separated from container 120 with an insulator (not shown). According to an exemplary embodiment, cover 130 is aluminum or another suitable conductive material and is conductively coupled to an electrode in battery 110. Cover 130 comprises a generally flat, circular surface or body 132, and a generally vertical side wall 133 that extends upward from and substantially perpendicular to surface 132. Side wall 133 is a curved feature that substantially follows the contour of side wall 122 of container 120 and has an outer diameter less than the inner diameter of side wall 122. Cover 130 is configured to fit inside the open end of container 120. Cover 130 also includes a feature shown as flange 134.

Flange 134 is a generally flat member (e.g., tab, flap, projection, extension, etc.) that is integrally formed with side wall 133 and extends upward therefrom. Flange 134 may be bent and have a vertical portion 136 and a horizontal portion 138 that extends outward past side wall 133 in a direction generally opposite horizontal portion 128 of flange 124.

Referring now to FIG. 10, a plurality of batteries 110 are shown connected in series to form a portion of a battery module or battery system. According to an exemplary embodiment, vertical portion 136 of flange 134 on cover 130 is longer than vertical portion 126 of flange 124 on container 120. When a first battery 110 is coupled to a second battery 110 (e.g., by welding), horizontal portion 138 of flange 134 on one battery 110 rests on horizontal portion 128 of flange 124 on another battery 110. According to an exemplary embodiment, flanges 124, 134 are welded together. According to other exemplary embodiments, flanges 124, 134 may be coupled in another suitable manner, either permanently or temporarily (e.g., bolted, riveted, crimped, clamped, etc.). Flanges 124, 134 may act as terminals that can directly and conductively couple two batteries together, eliminating the need for a separate member to conductively couple the batteries.

Figures 11A, 11B, 11C, 11D:
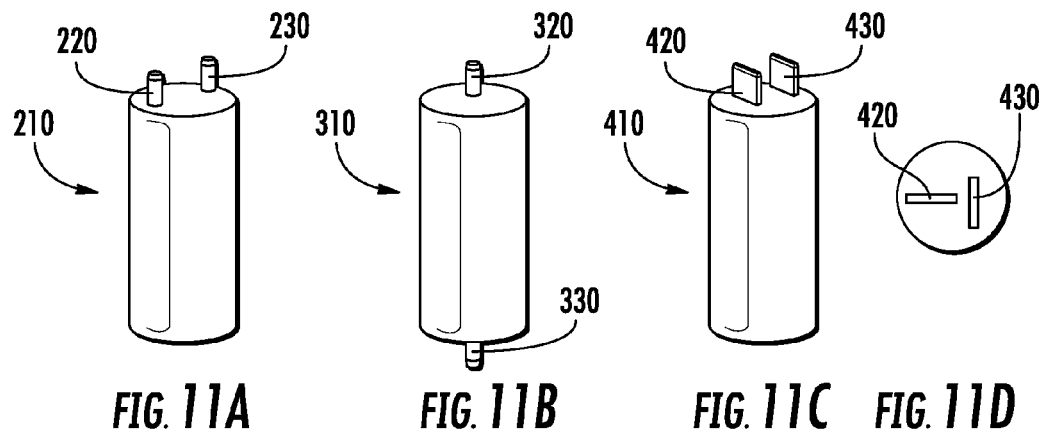
FIGS. 11A-11G are views of a battery according to various exemplary embodiments.

Referring now to FIGS. 11A-11G, a number of batteries are shown according to various exemplary embodiments. Each battery comprises a first terminal and a second terminal. According to the various exemplary embodiments, one or both of the terminals may be integrally formed as a part of the cover and/or container of the battery. FIG. 11A illustrates a battery 210 with terminals 220, 230 that are located on the same end of battery 210 and are substantially smooth pins. FIG. 11B illustrates a battery 310 with a first terminal 320 on one end and a second terminal 330 on an opposite end. According to an exemplary embodiment, terminals 320, 330 are substantially smooth pins.

FIG. 11C shows an exemplary embodiment of a battery 410 with terminals 420, 430 that are located on the same end of battery 410 and are generally thin flat members (e.g., blades). According to an exemplary embodiment, terminals 420, 430 are generally parallel. According to other exemplary embodiments, terminals 420, 430 may be at some other angle relative to each other (e.g., perpendicular to each other as in FIG. 11D).

Figures 11E, 11F, 11G:
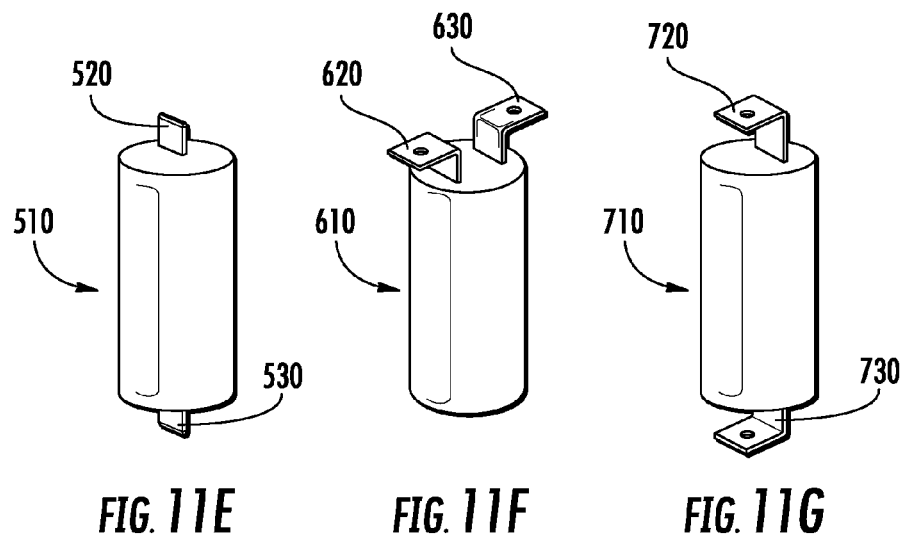

FIG. 11E shows an exemplary embodiment of a battery 510 with a first terminal 520 on one end and a second terminal 530 on an opposite end. Terminals 520, 530 are generally thin flat members (e.g. blades).

FIG. 11F shows an exemplary embodiment of a battery 610 with terminals 620, 630 that are located on the same end of battery 610 and are generally thin flat members bent into a generally L-shaped profile. According to an exemplary embodiment, first terminal 620 and second terminal 630 are bent such that the horizontal portions of terminals 620, 630 extend toward and beyond the periphery of battery 610. First terminal 620 and second terminal 630 are configured to have horizontal portions of slightly different lengths such that first terminal 620 on one battery 610 may rest on second terminal 630 of an adjacent battery 610.

FIG. 11G shows an exemplary embodiment of a battery 710 with a first terminal 720 on one end and a second terminal 730 on an opposite end. Terminals 720, 730 are generally thin flat members bent into a generally L-shape profile. According to an exemplary embodiment, terminals 720, 730 are bent such that the horizontal portions of terminals 720, 730 extend in the same direction. According to other exemplary embodiments, terminals 720, 730 may be bent in opposite directions or may extend at some other angle relative to each other.

Referring to FIG. 12, a battery 810 is shown according to an exemplary embodiment and includes a top portion, or cover 830, a bottom portion, or container 820, and a seal portion 860. According to an exemplary embodiment, cover 830 is provided with raised portions or terminals 840, 850 that may act as positive and/or negative terminals for battery 810. Terminals 840, 850 may be integrally formed with cover 830 (e.g., not welded) so as to reduce manufacturing costs and the number of component parts associated with battery 810.

As shown in FIG. 12, seal 860 may be applied around the upper portion of container 820. According to an exemplary embodiment, seal 860 comprises a polymer material such as a polyethylene, etc. According to various exemplary embodiments, other materials may be used to make seal 860. Seal 860 may be provided in a tape or strip form and wrapped around container 820 as shown in FIG. 12 and, if necessary, held in place with an adhesive (e.g., either as an integral part of seal 860 or as a separately provided component).

According to an exemplary embodiment, in order to attach cover 830 to container 820, cover 830 is first heated to expand the inside diameter of cover 830. While in the expanded condition, cover 830 is fitted over container 820 and seal 860 such that the heat from cover 830 at least partially melts seal 860, thereby helping to seal cover 830 to container 820. As cover 830 is allowed to cool, cover 830 contracts while positioned over container 820, forming a tight, sealed joint between cover 830 and container 820.

According to an exemplary embodiment, the inside diameter of cover 830 is approximately the same as the outside diameter of container 820, thereby providing a secure fit between cover 830 and container 820 after coupling of cover 830 to housing 820. According to various exemplary embodiments, the dimensions of cover 830 and/or container 820 may be varied to provide a more or less snug fit for various applications. Furthermore, seal 860 may be provided on cover 830 rather than container 820.

According to an exemplary embodiment, seal 860 is configured to act as a vent for battery 810. For example, seal 860 may deteriorate (e.g., melt, etc.) as a result of the pressure and/or temperature within battery 810 reaching a predetermined level, thereby permitting pressurized gases or other fluids to escape from within battery 810. This provides for a method of venting battery 810 that avoids the expense and time of manufacturing and assembling separate components to provide for venting of battery 810.

As shown in FIG. 12, battery 810 is provided as a generally cylindrical battery having a generally circular cross-section. Terminals 840, 850 shown in FIG. 12 are integrally formed with cover 830. Cover 830 may be either conductively coupled to or insulated from container 820. According to various other exemplary embodiments, battery 810 may take other shapes and forms, and terminals 840, 850 may be provided as integrally formed terminals in a variety of locations.

Referring now to FIG. 13, a battery 910 is shown according to an exemplary embodiment. As shown in FIG. 13, battery 910 includes a cover 930 and a container 920. According to an exemplary embodiment, container 920 includes terminals 940, 950 that may be integrally formed with container 920. A seal 960 that may be similar to seal 860 discussed with respect to FIG. 12 is provided around the lower portion of container 920 to seal cover 930 to container 920 in a manner similar to that discussed with respect to FIG. 12.

According to an exemplary embodiment, battery 910 is similar to battery 810 and may be manufactured and assembled in a similar manner except that terminals 940, 950 are integrally formed with container 920 (rather than with cover 930), and cover 930 is intended to engage the bottom portion of container 920 (rather than the top portion as shown in FIG. 12). Furthermore, battery 910 is provided with an elongated (e.g., oval, etc.) cross-section, rather than the generally circular cross-section of battery 810. According to various other exemplary embodiments, other modifications may be made to batteries 810, 910 in order to accommodate various specific applications. For example, seals 860, 960 may be reinforced by other methods of sealing (e.g., laser welding, sonic welding, adhesives, etc.).

Figure 14:
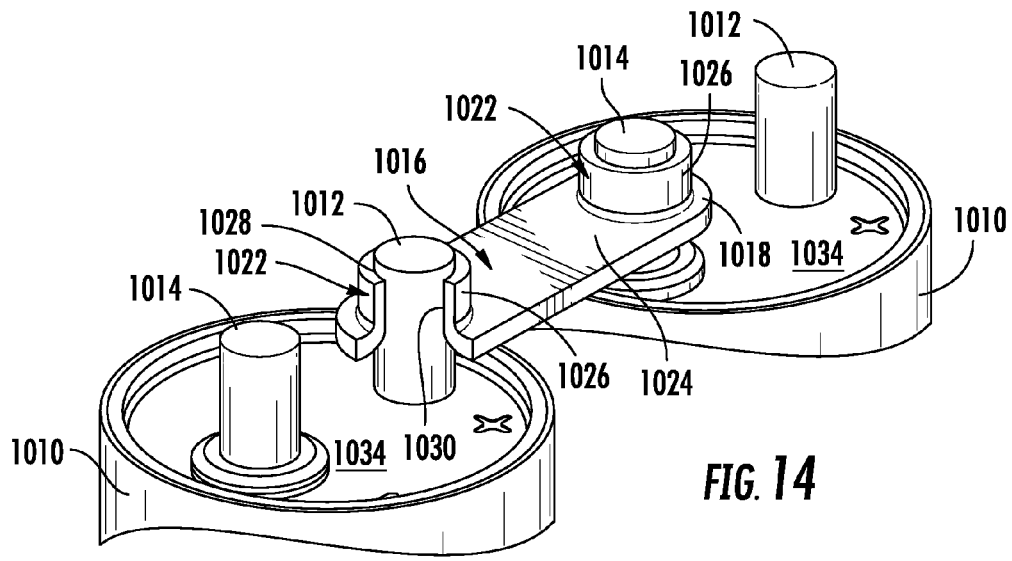
FIG. 14 is a perspective view of a first electrochemical cell coupled to a second electrochemical cell with a bus bar according to an exemplary embodiment.

Referring now to FIG. 14, a method of connecting the terminals 1012, 1014 of adjacent cells 1010 is shown according to an exemplary embodiment. Each of the cells 1010 are electrically coupled to one or more other cells 1010 or other components of the battery system 116 (shown, e.g., in FIG. 2A) using connectors provided in the form of bus bars 1016 or similar elements. For example, FIG. 14 shows two cells 1010 coupled together with a bus bar 1016 according to an exemplary embodiment. A portion of the bus bar 1016 is shown as a broken view to show the interface between the bus bar 1016 and the terminal 1012. The bus bar 1016 is a metallic member (e.g., copper, copper alloy, aluminum, aluminum alloy, etc.) that couples the negative terminal 1014 of a first cell 1010 to the positive terminal 1012 of a second cell 1010. The bus bar 1016 includes a first end 1018 that is coupled to the negative terminal 1014 of the first cell 1010 (e.g., by an interference fit, by welding, etc.) and a second end 1020 that is coupled to the positive terminal 1012 of a second cell 1010 (e.g., by an interference fit, by welding etc.).

The first end 1018 and the second end 1020 of the bus bar 1016 each include a projection 1022 (e.g., protruding ridge, lip, flange, extension, etc.) that is configured to substantially surround the terminal 1012, 1014 of a cell 1010. The projection 1022 may be cast or formed by a mechanical process such as a stamping operation, a punching operation, or an extrusion operation. The mechanical process causes the projection 1022 to extend outward from the top surface 1024 of the bus bar 1016. The projection 1022 forms a generally vertical wall 1026 that defines an aperture 1028 that is configured to receive the terminal 1012, 1014 of the projection 1022.

According to an exemplary embodiment, the aperture 1028 has a diameter that is smaller than the diameter of the terminal 1012, 1014 so that the bus bar 1016 is coupled to the cell 1010 with an interference fit when the terminal 1012, 1014 is received by the aperture 1028. The bus bar 1016 is assembled with the cells 1010 by first heating the bus bar 1016 (e.g., by induction heating, by an oven, by a flame or heating element, etc.). According to an exemplary embodiment, the heating of the bus bar 1016 occurs as part of an assembly line process where the bus bars 1016 being are heated (e.g., in an oven) in the assembly line and directly assembled with the cells 1010.

According to an exemplary embodiment, the bus bar 1016 is heated to a temperature sufficient to expand the material of the bus bar 1016, widening the aperture 1028 formed by the projection 1022 and allowing the terminal 1012, 1014 to be received by the aperture 1028 in the bus bar 1016. According to various exemplary embodiments, these temperatures may vary depending on the material properties of the bus bars 1016 (e.g., coefficient of thermal expansion). As the bus bar 1016 cools, the diameter of the aperture 1028 shrinks, forming an interference fit with the terminal 1012, 1016. An insulator 1132 (e.g., as shown in FIG. 15) may be provided below the bus bar 1016 and around the terminal 1012, 1014 to reduce the chance of inadvertent contact between the bus bar 1016 and the lid or cover 1034 of the cell 1010.

The bus bar 1016 may be further coupled to the cell 1010 with a welding operation such as an ultrasonic welding operation, a laser welding operation, or a resistance welding operation. According to an another exemplary embodiment, the bus bar 1016 may only be welded to the terminals 1012, 1014 of the cells 1010 instead of being provided with an interference fit and welded to the terminals 1012, 1014 of the cells 1010. According to an another exemplary embodiment, the bus bar 1016 may only be press fit to the terminals 1012, 1014 of the cells 1010 instead of being welded to the terminals 1012, 1014 of the cells 1010.

Figure 15:
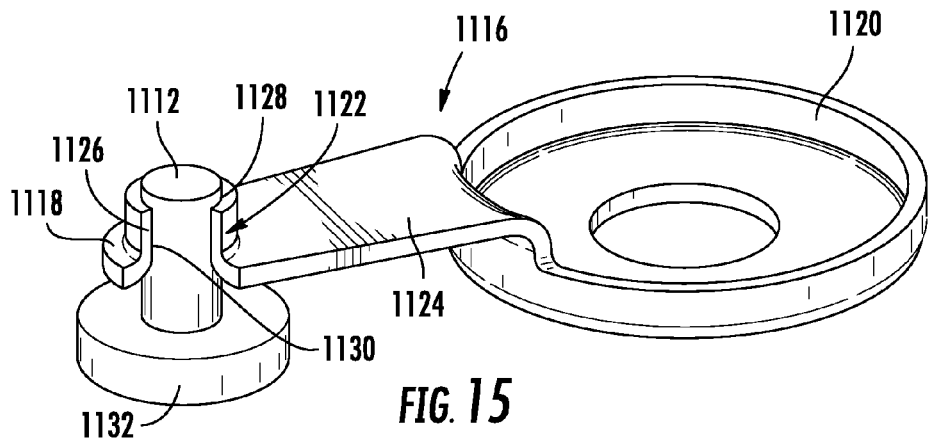
FIG. 15 is a perspective view of a bus bar coupled to a terminal of an adjacent electrochemical cell according to an exemplary embodiment.
Figure 16:
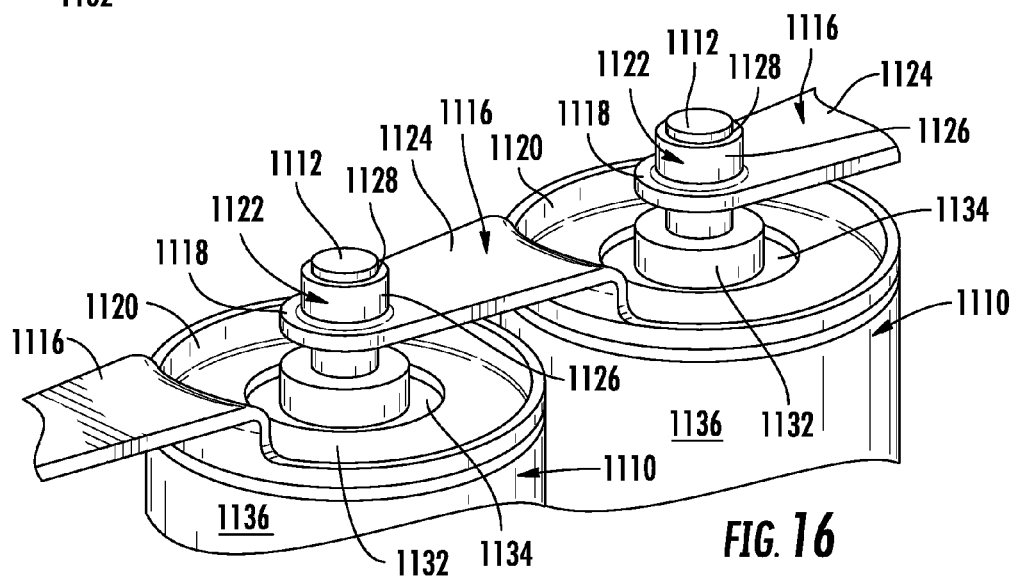
FIG. 16 is a perspective view of a portion of a battery module having a first electrochemical cell coupled to a second electrochemical cell with the bus bar as shown in FIG. 15.

FIGS. 15-16 show a bus bar 1116 according to another exemplary embodiment coupled to a terminal 1112 of a cell 1110. A portion of the bus bar 1116 is shown as a broken view to show the interface between the bus bar 1116 and the terminal 1112. The bus bar 1116 is a metallic member (e.g., copper, copper alloy, aluminum, aluminum alloy, etc.) that couples a first cell 1110 to a second cell (e.g., as shown in FIG. 16). The bus bar 1116 includes a first end 1118 that is coupled to a terminal 1112 of the first cell 1110 (e.g., by an interference fit, by welding, etc.) and a second end 1120 that is coupled to the housing 1136 of the second cell 1110 (e.g., by a press fit, by an interference fit, by welding, etc.). The first end 1118 of the bus bar 1116 shown in FIG. 15 is similar to the first end 1018 of the bus bar 1016 shown in FIG. 14. However, the second end 1120 of the bus bar 1116 shown in FIG. 15 is configured to be coupled to the housing 1136 of a second, adjacent cell 1110 and to act as a cover for the second cell.

The first end 1118 of the bus bar 1116 includes a projection 1122 (e.g., protruding ridge, lip, flange, extension, etc.) that is configured to substantially surround the terminal 1112 of a first cell 1110. The projection 1122 may be cast or may be formed by a mechanical process such as a stamping operation, a punching operation, or an extrusion operation. The mechanical process causes the projection 1122 to extend outward from a top surface 1124 of the bus bar 1116. The projection 1122 forms a generally vertical wall 1126 that defines an aperture 1128 that is configured to receive the terminal 1112 of the cell 1010. In other words, the terminal 1112 is received in the aperture 1128 defined by the projection 1122 of the bus bar 1116 such that contact is made between the terminal 1112 and an inner surface 1130 of the projection 1122.

FIG. 16 shows a portion of a battery module including two cells 1110 coupled together with the bus bar 1116 of FIG. 15. The cells 1110 are generally cylindrical bodies with a top or first surface 1134 having a terminal 1112 (e.g., a negative terminal, a positive terminal) that extends generally upward from the top surface 1134. The terminal 1112 is electrically coupled to a first electrode (not shown) inside the housing 1136 of the cell 1110 (e.g., a negative electrode, a positive electrode). However, the terminal 1112 is electrically insulated from the housing 1136 itself (e.g., by an insulator 1132). The housing 1136 of the cell 1110, including the top surface 1134 of the cell 1110, is electrically coupled to a second electrode (not shown) inside the housing 1136 of the cell 1010 (e.g., a positive electrode, a negative electrode).

The bus bar 1116 is coupled to the cells 1110 by first coupling the second end 1120 of the bus bar 1116 to the top surface 1134 of the of the second cell 1110. According to an exemplary embodiment, the second end 1120 of the bus bar 1116 is press fit into the top of the housing 1136 of the second cell 1110 and then welded (e.g., ultrasonic, laser, resistance, etc.) to form a cover for the cell 1110 (i.e., the cover includes an extension or flange that acts as a bus bar or terminal for coupling to an adjacent cell). According to another exemplary embodiment, the second end 1120 of the bus bar 1116 is larger than the diameter of the top of the second cell 1110 and is coupled to the top of the second cell 1110 with an interference fit. The second end 1120 of the bus bar 1116 is shrunk (e.g., reduced in size, made smaller, etc.) by a cooling process (e.g., using liquid nitrogen). The second end 1120 of the bus bar 1116 is then placed into the open end of the top of the second cell 1110 and allowed to return to room temperature. The second end 1120 of the bus bar 1116 may then be further coupled to the cell 1110 by a welding operation such as an ultrasonic welding operation, a laser welding operation, or a resistance welding operation.

The first end 1118 of the bus bar 1116 is then coupled to the terminal 1112 of the first cell 1110. According to an exemplary embodiment, the first end 1118 of the bus bar 1116 is welded (e.g., ultrasonic, laser, resistance, etc.) to the terminal 1112 of the first cell 1110. According to another exemplary embodiment, the first end 1118 of the bus bar 1116 is press fit to the terminal 1112 of the first cell 1110. According to another exemplary embodiment, the aperture 1128 in the first end 1118 of the bus bar 1116 has a diameter that is smaller than the diameter of the terminal 1112 so that the first end 1118 of the bus bar 1116 is coupled to the terminal 1112 of the first cell 1110 with an interference fit. The first end 1118 of the bus bar 1116 is heated (e.g., by placing the first end 1118 near a heating element or a flame). Heating the first end 1118 of the bus bar 1116 expands the metal, widening the aperture 1128 formed by the projection 1122 and allowing the terminal 1112 to be received in the aperture 1128 in the first end 1118 of the bus bar 1116. As the bus bar 1116 cools, the diameter of the aperture 1128 shrinks, forming an interference fit with the terminal 1112. An insulator 1132 (e.g., as shown in FIG. 16) may be provided below the bus bar 1116 and around the terminal 1112 to reduce the chance of inadvertent contact between the bus bar 1116 and the housing 1136 of the cell 1010. The bus bar 1116 may then be further coupled to the terminal 1112 of the cell 1010 with a welding operation such as an ultrasonic welding operation, a laser welding operation, or a resistance welding operation.

Referring now to FIGS. 17-18, a cell can or housing 1212 (e.g., a container, casing, etc.) for an electrochemical cell 1210 is shown according to an exemplary embodiment. The housing 1212 is configured to receive or house a cell element (e.g., a wound cylindrical cell element) that is not shown. According to an exemplary embodiment, the housing 1212 comprises a three-piece structure, comprising a main body 1214 (that may, e.g., be made from an aluminum tube or tubing), a first cover or bottom 1216, and a second cover or lid 1218 that includes a flange (e.g., a tab, flap, projection, extension, protrusion, projection, lip, overhang, protuberance, etc.) that acts as a bus bar or terminal for coupling the cell 1210 to a terminal of an adjacent cell.

As shown in FIG. 18, the three-piece housing 1212 provides for a flexible design that may be varied (e.g., in length) to provide for various sizes and capacities of cell elements. For example, a different length main body 1214 may be used with the same bottom 1216 and lid 1218. Additionally, internal connections (e.g., current collectors, etc.) may be changed for different applications without affecting the design of the external interface (e.g., the lid 1218, the bus bars 1226, etc.) of the module that the cells 1210 are provided in. Furthermore, this type of separate component design allows for lower cost tooling for development and higher efficiencies in economies of scale in that the same design for the bottom 1216 and the lid 1218 may be used interchangeably with different lengths of the main body 1214.

According to an exemplary embodiment, the separate components (i.e., the main body 1214, bottom 1216, and lid 1218) are easier to clean and handle than previous designs. For example, the main body 1214, bottom 1216, and lid 1218 may be cleaned separately and then assembled together. Previous designs having the bottom or the lid integral with the main body made it difficult to clean the inside of the main body and/or the bottom or lid. Having separate components allows for full accessibility to all of the components of the housing 1212.

Referring now to FIG. 18, the bottom 1216 may have an integral vent feature 1220 according to an exemplary embodiment. The vent feature 1220 may be configured to separate or deploy from the bottom 1216 if the pressure inside the housing 1212 reaches a predetermined amount. Various sized vents 1220 may be used with the bottom 1216, allowing different internal pressures to be obtained depending on the design (e.g., size) of the vent 1220 used. Additionally, the various sized vents 1220 may be interchanged with different sized housings 1212, dependent upon the needs of the application. According to an exemplary embodiment, the bottom 1216 is coupled (e.g., by a welding process, such as laser welding) to a lower portion of the housing 1212.

Referring to FIGS. 19-20, the cover 1218 or lid for the housing 1212 is shown according to an exemplary embodiment. The lid 1218 includes a first terminal 1222 (e.g., a positive terminal) that may be provided, for example, in the center of the lid 1218. The first terminal 1222 is insulated from the lid 1218 by the use of an insulating material or insulating device shown as an insulator 1224. The first terminal 1222 may be coupled to an electrode (e.g., a positive electrode) of the cell element (not shown) with a current collector (not shown). According to an exemplary embodiment, the lid 1218 is coupled (e.g., by welding process, such as laser welding) to an upper portion of the housing 1212.

Still referring to FIGS. 19-20, the lid 1218 also comprises a member shown as a flange (e.g., a tab, flap, projection, extension, protrusion, projection, lip, overhang, protuberance, etc.) that may act as a terminal or bus bar 1226 for the cell 1210. According to an exemplary embodiment, the bus bar 1226 is integral with the lid 1218 (i.e., the bus bar 1226 and lid 1218 are a single unitary body). Having the bus bar 1226 integral with the lid 1218 reduces the overall component count of the system. Additionally, the number of fasteners (not shown) required (e.g., to couple the bus bars 1226 to the terminals 1222) is reduced. Furthermore, the overall system cost may be reduced by eliminating or reducing the amount of copper used by having integral bus bars 1226.

As shown in FIGS. 19-20, the bus bar 1226 extends out and away from the lid 1218. According to an exemplary embodiment, the bus bar 1226 is at a height that is different (i.e., higher) than the height of the lid 1218, allowing the bus bar 1226 to be placed over (i.e., on top of) a terminal 1222 of an adjacent cell 1210. The bus bar 1226 is configured with an aperture 1228 at an end of the of the bus bar 1226. According to an exemplary embodiment, the aperture 1228 is configured to allow a fastener (not shown) to be placed through the aperture 1228 in order to couple the bus bar 1226 to a terminal 1222 of an adjacent cell 1210.

According to another exemplary embodiment, the lid 1218 may also comprise an aperture or hole shown as fill hole 1230. Fill hole 1230 is configured to allow a substance (e.g., electrolyte) to be placed in the cell 1210 after the cell 1210 is assembled. According to another exemplary embodiment, the lid may also comprise an aperture or hole 1234 (e.g., as shown in FIG. 20) configured to receive the first terminal 1222 and insulator 1224.

According to another exemplary embodiment, the bus bar 1226 may function as a second terminal 1232 (e.g., a negative terminal) of the cell 1210 due to the fact that the bus bar 1226 may be electrically connected to an electrode (e.g., a negative electrode) of the cell element (not shown). The bus bar 1226, being integral with the lid 1218, may be connected to the electrode by the lid 1218 being electrically connected to the main body 1214 of the housing 1212. The main body 1214 of the housing 1212 is electrically connected to the bottom 1216 of the housing 1212, which in turn is then electrically connected to the electrode of the cell element, completing the connection from the bus bar 1226 to the electrode.

Referring now to FIGS. 21-24, a battery module 1300 utilizing cells 1310 having lids 1312 with integral terminals or bus bars 1314 is shown according to an exemplary embodiment. The battery module 1300 may be electrically coupled with other battery modules 1300 to form a battery system (not shown) or may be used independently to form its own battery system. The battery system may include other features (not shown) that are responsible for monitoring and controlling the electrical performance of the system, managing the thermal behavior of the system, containment and/or routing of effluent (e.g., gases that may be vented from a cell 1310), and other aspects of the battery module 1300 or battery system.

Figure 21:
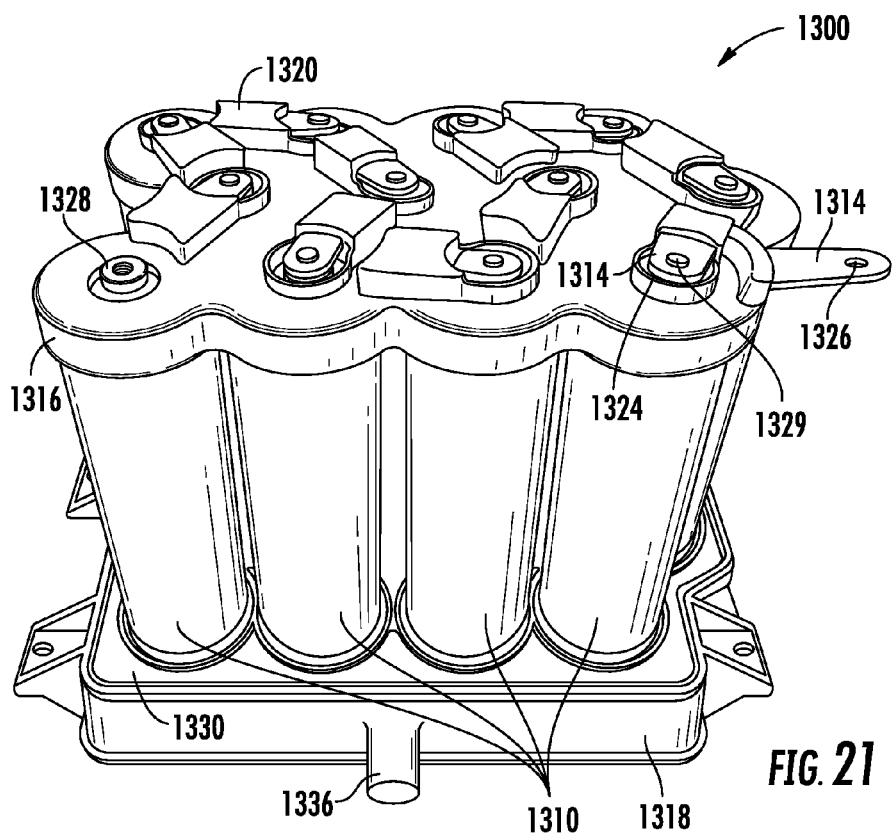
FIG. 21 is a perspective view of a battery module according to an exemplary embodiment.

As shown in FIG. 21, the battery module 1300 includes a plurality of electrochemical cells 1310 each having a flange (e.g., a tab, flap, projection, extension, protrusion, projection, lip, overhang, protuberance, etc.) shown as an integral terminal or bus bar 1314 formed in the lid 1312 of the cell 1310, a first structure or upper tray 1316, and a second structure or the lower tray 1318. The plurality of cells 1310 are provided in between the upper tray 1316 and the lower tray 1318. Although illustrated in FIG. 21 as having a particular number of electrochemical cells 1310, it should be noted that according to other exemplary embodiments, a different number and/or arrangement of electrochemical cells 1310 may be used depending on any of a variety of considerations (e.g., the desired power for the battery module 1300, the available space within which the battery module 1300 must fit, etc.).

According to an exemplary embodiment, the upper tray 1316 comprises features 1320 (e.g., raised portions, cutouts, channels, spaces, molded areas, etc.) that receive the integral bus bars 1314 of the individual cells 1310 to properly orientate or align the cells 1310 (and the integral bus bars 1314) so that the bus bars 1314 are properly aligned to be connected to an adjacent cell 1310. The upper tray 1316 also comprises a feature shown as a wall 1322 (as shown, e.g., in FIG. 24) that partially surrounds the upper portion of the cell 1310 to aid in properly locating the cell 1310. It should be noted that the bus bars 1314 used in connection with the upper tray 1316 need not be integral with the lid 1312 (i.e., the upper tray 1316 will still be able to properly align and orientate cells 1310 having non-integral bus bars 1314).

Figure 22:
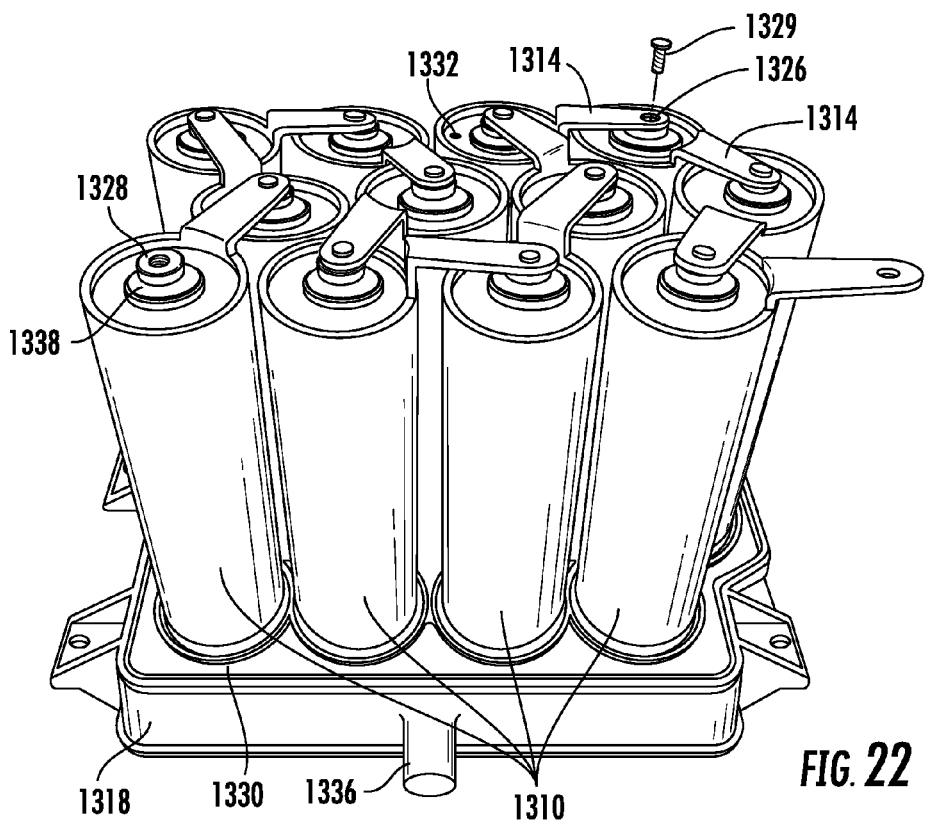
FIG. 22 is a perspective view of the battery module as shown in FIG. 21 with an upper tray removed.

According to another exemplary embodiment, the upper tray 1316 also comprises openings or apertures 1324 that expose a portion of the bus bar 1314 (e.g., the end of the bus bar 1314 having an aperture 1326) to be coupled (e.g., with a fastener, by welding, etc.) to a terminal 1328 of an adjacent cell 1310. According to an exemplary embodiment, the terminal 1328 of the adjacent cell 1310 is threaded (e.g., to receive a fastener 1329, as shown in FIG. 22). According to another exemplary embodiment, the terminal 1328 of the adjacent cell 1310 may be flat so that the terminal 1328 may be welded to the bus bar 1314. The upper tray 1316 may be made of a polymer (e.g., polypropylene, polyethylene, etc.) or any other suitable material (e.g., insulative material).

Still referring to FIG. 21, the battery module 1300 is shown to include a seal 1330 provided along an upper surface of the lower tray 1318 in order to seal a chamber (not shown) located inside the lower tray 1318. According to an exemplary embodiment, the seal 1330 is configured to seal the gap between the lower portion of the cells 1310 and the lower tray 1318 (when the cells 1310 are placed in the lower tray 1318). According to an exemplary embodiment, the seal 1330 may be constructed from silicone (e.g., molded silicone) or other appropriate material.

According to an exemplary embodiment, the seal 1330 is configured to aid in containing any gases that are vented from the cells 1310 into the chamber. For example, gases may be vented from the cells 1310 via a vent device or vent feature 1334 located at the lower end of each of the cells 1310 (shown, e.g., in FIGS. 23-24). According to another exemplary embodiment, an opening or outlet 1336 (e.g., as shown in FIG. 21) may be provided in fluid connection with the chamber. The outlet 1336 may be used to direct gases from the chamber (after having been vented from the cells 1310) to outside the battery module 1300 (e.g., outside the vehicle).

Referring now to FIG. 22, the battery module 1300 is shown with the upper tray 1316 removed. As can be seen in FIG. 22, the bus bars 1314 of the cells 1310 are properly oriented so that they are ready for connection to a terminal 1328 of an adjacent cell 1310 (or for connection to another module 1300 or other component of the battery system). According to another exemplary embodiment, the battery module 1300 may also include an aperture or hole shown as fill hole 1332 in the lid 1312 of the cell 1310. The fill hole 1332 allows a substance (e.g., an electrolyte) to enter the cell 1310.

Figure 23:
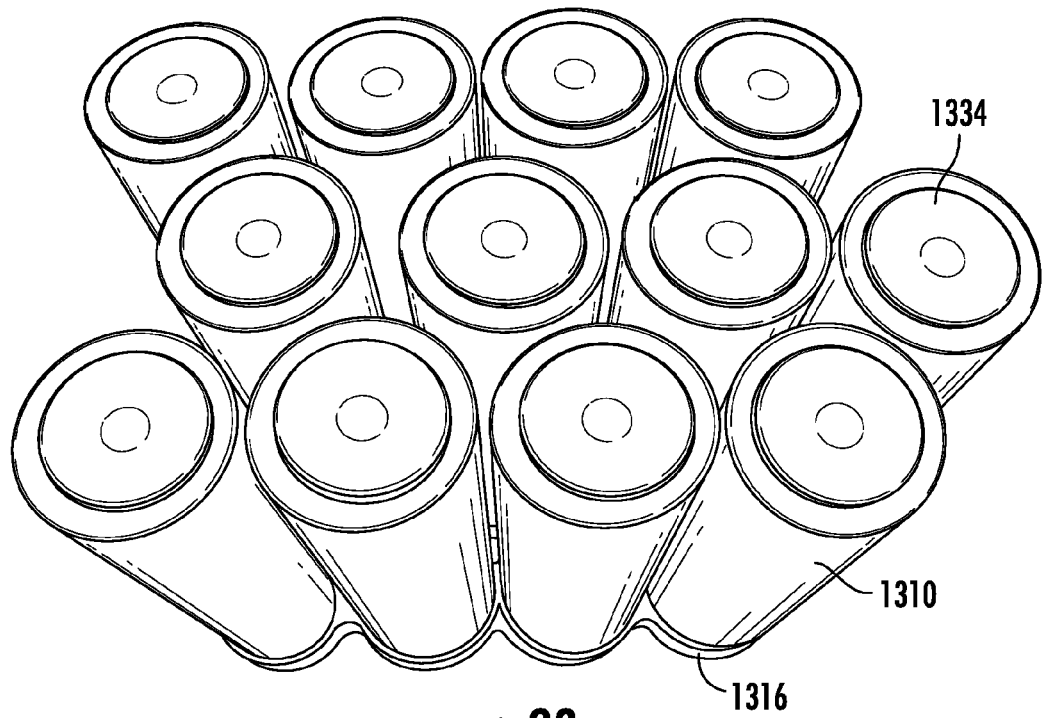
FIG. 23 is a perspective view of a plurality of electrochemical cells provided in an upper tray according to an exemplary embodiment.
Figure 24:
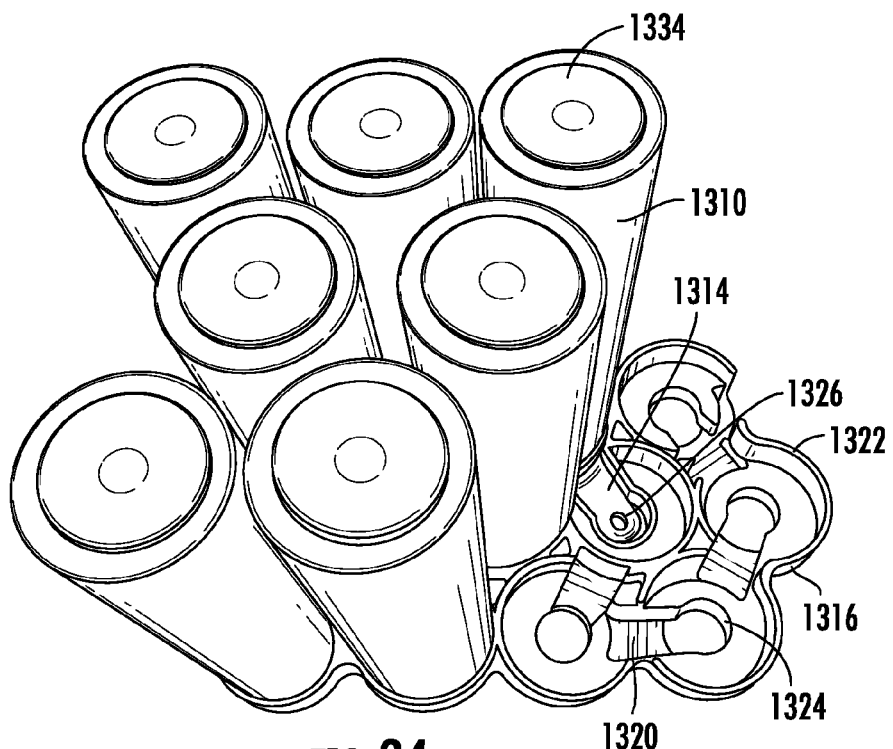
FIG. 24 is a perspective view of a plurality of electrochemical cells provided in an upper tray according to an exemplary embodiment.
Figure 25:
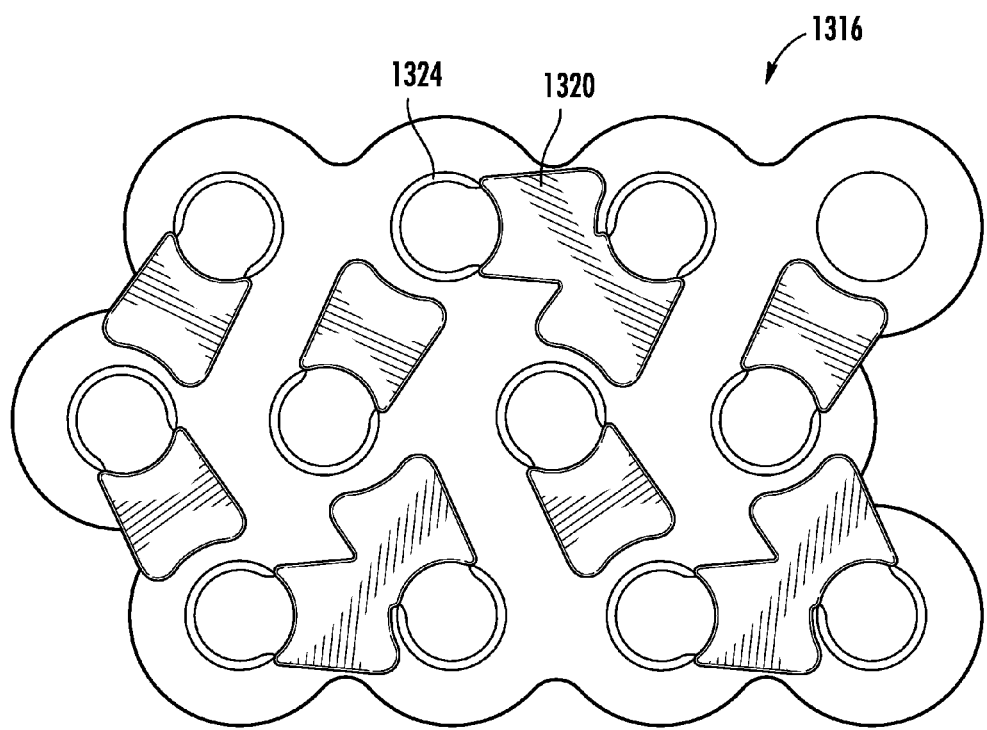
FIG. 25 is a top view of the upper tray as shown in FIG. 21.
Figure 26:
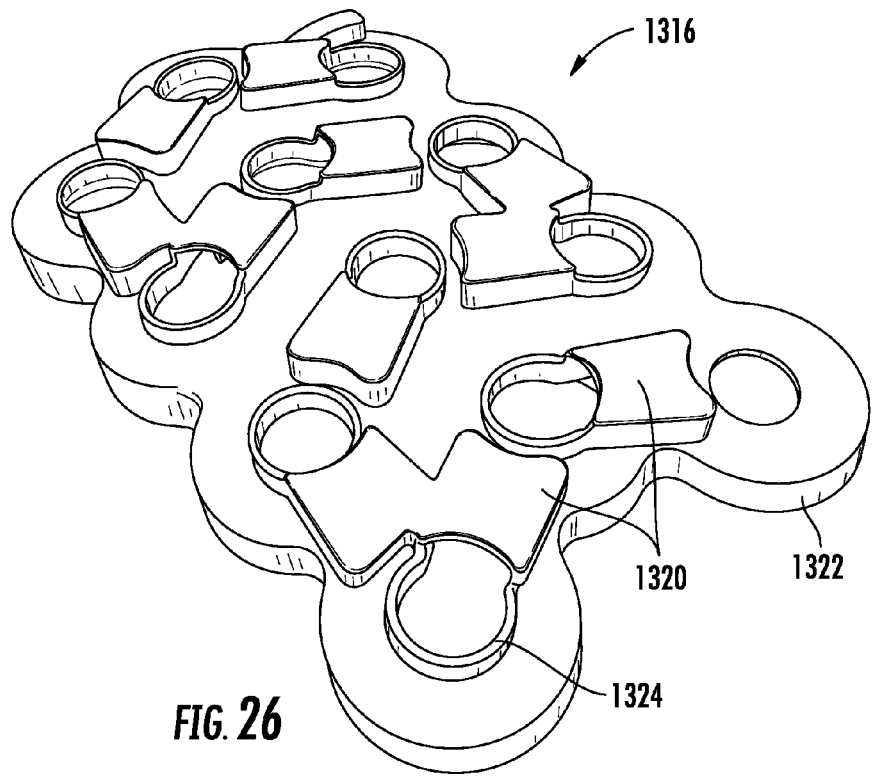
FIG. 26 is a perspective view of the upper tray as shown in FIG. 21.
Figure 27:
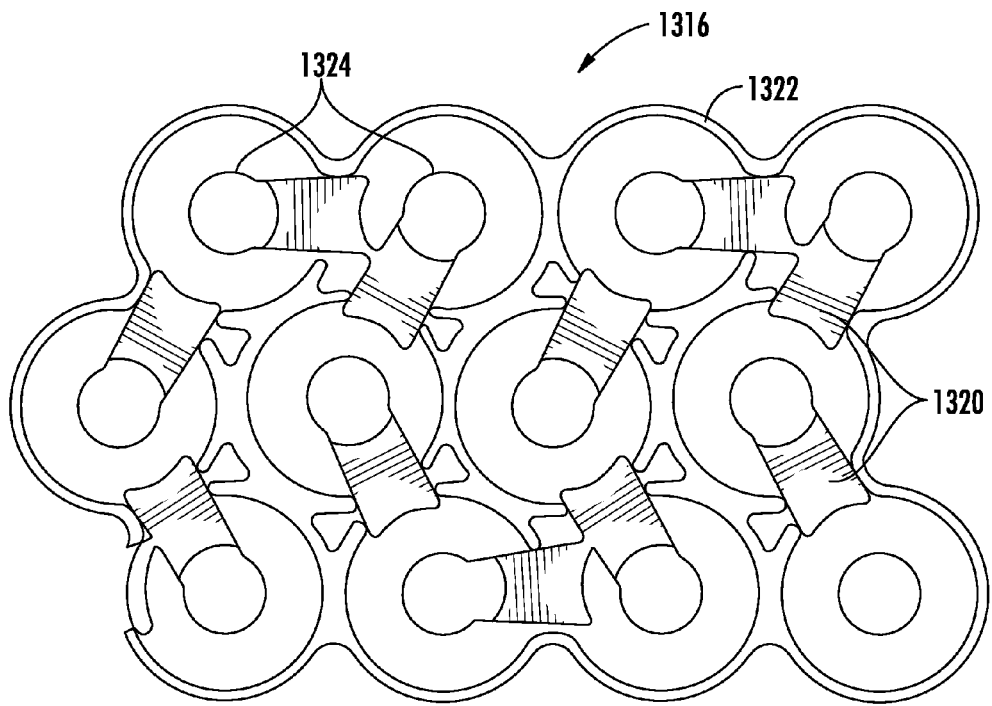
FIG. 27 is a bottom view of the upper tray as shown in FIG. 21.
Figure 28:
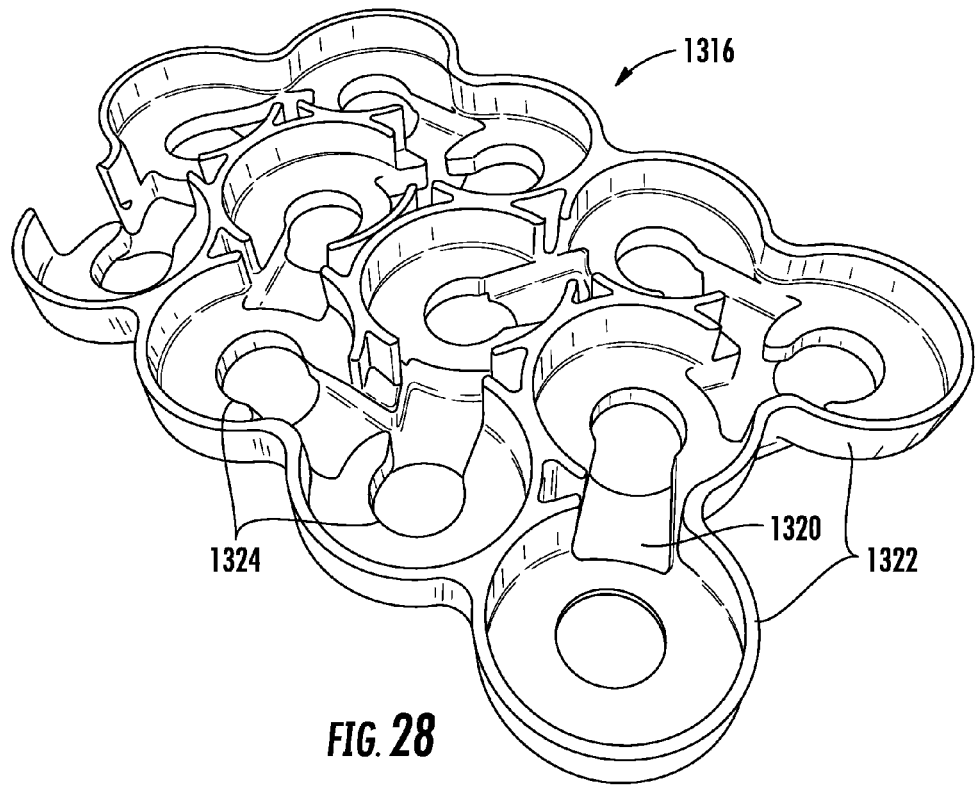
FIG. 28 is a bottom perspective view of the upper tray as shown in FIG. 21.

As shown in FIGS. 23-28, the upper tray 1316 may be used as an assembly tool or fixture according to an exemplary embodiment. As can be seen in FIGS. 23-24, the cells 1310 having the integral bus bars 1314 are provided in the upper tray 1316 (which is provided upside down). The alignment features 1320 (shown as depressions in FIGS. 24, and 27-28) provided in the upper tray 1316 provide for an assembly/fixturing tool for properly aligning and orientating the individual cells 1310 into place when assembling the module 1300. Utilizing the upper tray 1316 as an assembly tool saves time, energy, and money in assembling the battery module 1300. As noted above, the bus bars 1314 used in connection with the upper tray 1316 need not be integral with the lid 1312 (i.e., the upper tray 1316 will still be able to properly align and orientate cells 1310 having non-integral bus bars 1314).

The cells 1310 (having either an integral bus bar 1314 or a separate bus bar coupled to the lid 1312) are provided upside down into the upper tray 1316 (i.e., the end of the cell 1310 having the lid 1312 and bus bar 1314 are placed into the upper tray 1316). The bus bar 1314 of each individual cell 1310 will be aligned for proper coupling with the terminal 1328 of another cell 1310 (or to other components of the battery module 1300 or battery system). Additionally, the wall features 1322 of the upper tray 1316 may aid in properly locating the individual cells 1310.

Once all of the cells 1310 are properly located in the upper tray 1316, the bottom tray 1318 is assembled to the cells 1310 (again, upside down). The bottom tray 1318 may have a seal 1330 provided on it to seal the lower end of the cells 1310 (as shown in FIG. 21). The battery module 1300 is then turned right side up where the bus bars 1314 are then coupled to their respective terminal 1328 (e.g., by a fastener, by welding, etc.).

According to one exemplary embodiment, a battery module includes a plurality of electrochemical cells provided in between a bottom tray and an upper tray. The electrochemical cells may include a housing having a tubular main body, a bottom, and a lid. The bottom may include a vent feature to allow venting of gases and/or effluent from inside the housing. The lid may include a first terminal that is insulated from the lid and a bus bar that is integral to the lid. The integral bus bar may serve as a second terminal of the cell. The battery module may also include a seal provided between the lower end of the cell and the lower tray to seal a chamber configured to receive vented gases from the cells. The upper tray may include features and/or cutouts to help properly align and orientate the cells having integral bus bars.

According to another exemplary embodiment, the battery module includes a plurality of electrochemical cells provided in between a first structure and a second structure. Each of the electrochemical cells includes a feature extending from a top of the electrochemical cells, the feature configured to electrically couple the electrochemical cell to a terminal of an adjacent electrochemical cell or other component of the battery module. The first structure includes features to properly orientate each of the electrochemical cells.

According to another exemplary embodiment, a method of assembling a battery module includes providing a plurality of electrochemical cells in a first structure. Each of the plurality of electrochemical cells has a lid having an integral bus bar. The first structure has features to properly orientate the integral bus bars of each of the plurality of electrochemical cells. The method further includes providing a second structure over the ends of the electrochemical cells.

One advantageous feature of providing terminals that are integrally formed with a cover, lid, or container for a battery or cell is that the need to separately manufacture and couple the terminal to the cover, lid, or container is eliminated. In this manner, labor and manufacturing costs may be reduced as compared to other cells in which terminals are separately manufactured from the lid, cover, or container (e.g., by eliminating steps in the manufacturing operation). Additionally, providing terminals that are integrally formed reduces the opportunity for failure modes to take effect (e.g., because the terminal is not welded to the cover or container, there is not a weld point which may be a point of electrical shorting or failure).

Those reviewing this disclosure will appreciate that various exemplary embodiments have been shown and described, and that according to various exemplary embodiments, features associated with one exemplary embodiment may be used with features included in other exemplary embodiments.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery and battery module as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the battery may be non-cylindrical (e.g., oval, rectangular, etc.), the position of elements may be reversed or otherwise varied (e.g., orientation of terminals), and the battery could be a number of different of types (e.g., nickel metal hydride, lithium ion, lithium polymer, etc.). Accordingly, all such modifications are intended to be included within the scope of the present inventions. The order or sequence of any process or method steps may be varied or re-sequenced according to exemplary embodiments. Other substitutions, modifications, changes and omissions may be made in the design, operating conditions and arrangement of the various exemplary embodiments without departing from the scope of the present invention.

What is claimed is:

1. A battery comprising:
a housing having a central longitudinal axis;
a cover coupled to the housing; and
a first flange integrally formed with the cover and configured to act as a first terminal for the battery, wherein the first flange comprises a first portion that extends generally parallel to the central longitudinal axis of the housing, and a second portion that extends outwardly beyond the housing in a direction perpendicular to the central longitudinal axis of the housing;
wherein the first flange on a first cell is configured to couple to a second flange on an adjacent cell in a battery system.

2. The battery of claim 1, wherein the housing is conductively coupled to the second flange and the cover is electrically insulated from the housing.

3. The battery of claim 1, wherein at least one of the first flange and the second flange comprise aluminum.

4. The battery of claim 1, wherein the housing is generally cylindrical and the first flange and second flange extend beyond the circumference of the housing.

5. The battery of claim 1, wherein the first flange has a first polarity and the second flange has a second polarity opposite that of the first polarity.

6. The battery of claim 1, wherein both the first flange and the second flange comprise a first portion that extends generally parallel to the central longitudinal axis of the housing and a second portion that extends generally perpendicular to the central longitudinal axis of the housing, wherein the first portion of the first flange extends a first distance beyond and end of the housing and the first portion of the second flange extends a second distance beyond the end of the housing, the first distance differing from the second distance.

7. The battery of claim 6, wherein the first distance is greater than the second distance.

8. The battery of claim 1, wherein the cover comprises a generally flat surface and a wall that extends upward from and generally perpendicular to the flat surface, wherein the first flange is integrally formed with the wall.

9. The battery of claim 8, wherein the generally flat surface has a substantially circular shape.

10. The battery of claim 1, wherein the first flange includes an aperture for receiving the terminal of the adjacent battery.

11. The battery of claim 1, wherein the cover includes an aperture through which a second terminal for the battery extends.

12. The battery of claim 11, wherein the second terminal is electrically isolated from the cover.

13. The battery of claim 1, wherein a portion of the first flange is configured to be provided in contact with a surface of the terminal of the adjacent battery.

14. The battery of claim 13, wherein the first flange includes an aperture and is configured to receive a fastener for coupling the first flange to the terminal of the adjacent battery.

15. The battery of claim 1, wherein the battery is a lithium-ion battery.

16. The battery of claim 1, wherein the first flange is configured to directly couple with the terminal of the adjacent battery.

17. The battery of claim 16, wherein the adjacent battery has a central longitudinal axis that is generally parallel with and offset to the central longitudinal axis of the battery, and the terminal of the adjacent battery extends in a direction generally parallel with the central longitudinal axis of the adjacent battery.

18. The battery of claim 17, wherein the portion of the first flange extending outward beyond the housing in the direction perpendicular to the central longitudinal axis of the housing is configured to couple directly to the terminal of the adjacent battery.

19. The battery of claim 1, wherein the cover includes the first flange.

20. The battery of claim 1, wherein the first flange overhangs the housing in the direction perpendicular to the central longitudinal axis.

21. A lithium-ion battery module comprising:
a housing having a central longitudinal axis;
a cover coupled to the housing;
a first lithium-ion cell having a first flange configured to act as a first terminal for the cell, wherein the first flange comprises a first portion that extends generally parallel to the central longitudinal axis of the housing, and a second portion that extends outwardly beyond the housing in a direction perpendicular to the central longitudinal axis of the housing; and
a second lithium-ion cell adjacent to the first lithium-ion cell, wherein the second cell has a second flange configured to couple to the first flange.

* * * * *